(12) United States Patent
Suh et al.

(10) Patent No.: US 8,874,683 B2
(45) Date of Patent: Oct. 28, 2014

(54) METHOD OF PROCESSING NON-REAL TIME SERVICE AND BROADCAST RECEIVER

(75) Inventors: Jong Yeul Suh, Seoul (KR); Gomer Thomas, Arlington, WA (US); Jae Hyung Song, Seoul (KR); Jin Pil Kim, Seoul (KR); Ho Taek Hong, Seoul (KR); Joon Hui Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 969 days.

(21) Appl. No.: 12/591,414

(22) Filed: Nov. 18, 2009

(65) Prior Publication Data

US 2010/0180007 A1    Jul. 15, 2010

Related U.S. Application Data

(60) Provisional application No. 61/115,888, filed on Nov. 18, 2008, provisional application No. 61/121,178, (Continued)

(51) Int. Cl.
| | |
|---|---|
| *G06F 15/16* | (2006.01) |
| *G06F 15/177* | (2006.01) |
| *H04H 60/33* | (2008.01) |
| *G06F 3/00* | (2006.01) |
| *H04H 20/71* | (2008.01) |
| *H04N 5/46* | (2006.01) |
| *H04N 5/50* | (2006.01) |
| *H04N 21/235* | (2011.01) |
| *H04N 21/434* | (2011.01) |
| *H04N 21/435* | (2011.01) |

(52) U.S. Cl.
CPC ........... *H04N 21/435* (2013.01); *H04N 21/235* (2013.01); *H04N 21/4345* (2013.01)

USPC ............... 709/217; 709/220; 709/245; 725/9; 725/56; 370/312; 348/729; 348/731

(58) Field of Classification Search
None
See application file for complete search history.

(56) References Cited

U.S. PATENT DOCUMENTS

| 2002/0169885 | A1* | 11/2002 | Alao et al. | .................... 709/230 |
|---|---|---|---|---|
| 2006/0059267 | A1 | 3/2006 | Cugi et al. | |

(Continued)

FOREIGN PATENT DOCUMENTS

| KR | 10-2005-0042377 | 5/2005 |
|---|---|---|
| WO | WO 2006/030309 | 3/2006 |
| WO | WO 2008/084441 | 7/2008 |

*Primary Examiner* — Ranodhi Serrao
*Assistant Examiner* — Farrukh Hussain
(74) *Attorney, Agent, or Firm* — Mckenna Long & Aldridge LLP

(57) ABSTRACT

A method of receiving and processing a broadcast signal including a Non-Real Time (NRT) service and a broadcast receiver are disclosed herein. A method of processing a Non-Real Time (NRT) service in a broadcast receiver, the method comprises receiving and processing first signaling information including content access information and second signaling information including content detail information, receiving and processing third signaling information including content update information, receiving and storing a content including at least one file through NRT based on the first signaling information and the second signaling information, identifying update availability of the content based on the content update information included in the third signaling information, and receiving at least one file included in the content by accessing a File Delivery over Unidirectional Transport (FLUTE) session transmitting the content when the update is available.

12 Claims, 22 Drawing Sheets

Related U.S. Application Data filed on Dec. 9, 2008, provisional application No. 61/121,181, filed on Dec. 9, 2008, provisional application No. 61/138,494, filed on Dec. 17, 2008, provisional application No. 61/153,973, filed on Feb. 20, 2009, provisional application No. 61/153,985, filed on Feb. 20, 2009, provisional application No. 61/179,005, filed on May 17, 2009, provisional application No. 61/236,138, filed on Aug. 23, 2009, provisional application No. 61/236,859, filed on Aug. 25, 2009, provisional application No. 61/258,596, filed on Nov. 6, 2009.

(56) References Cited

U.S. PATENT DOCUMENTS

2007/0256098 A1* 11/2007 Yum .............................. 725/38
2009/0040372 A1* 2/2009 Bae et al. ................... 348/436.1

* cited by examiner

FIG. 4

| Syntax | No. of Bits | Format |
|---|---|---|
| virtual_channel_table_section(){ | | |
|     table_id | 8 | 0xC8 |
|     section_syntax_indicator | 1 | '1' |
|     Private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0;i<num_channels_in_section;i++){ | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for(i=0;i<N;i++){ | | |
|             descriptor() | | |
|         } | | |
|     } | | |
|     reserved | 6 | '111111' |
|     additional_descriptors_length | 10 | uimsbf |
|     for(j=0;j<N;j++){ | | |
|         additional_descriptor() | | |
|     } | | |
|     CRC_32 | 32 | rpchof |
| } | | |

FIG. 5

| service_type | Meaning |
|---|---|
| 0x00 | [Reserved] |
| 0x01 | Analog_television - The virtual channel carries analog television programming |
| 0x02 | ATSC_digital_television - The virtual channel carries television programming (audio, video and optional associated data) conforming to ATSC standards |
| 0x03 | ATSC_audio - The virtual channel carries audio programming (audio service and optional associated data) conforming to ATSC standards |
| 0x04 | ATSC_data_only_service - The virtual channel carries a data service conforming to ATSC standards, but no video of stream_type 0x02 or audio of stream_type 0x81 |
| 0x05-0x3F | [Reserved for future ATSC use] |

FIG. 6

| Value | Meaning |
|---|---|
| 0x00 | [Reserved] |
| 0x01 | analog_television - The virtual channel carries analog television programming |
| 0x02 | ATSC_digital_television - The virtual channel carries television programming (audio, video and optional data) conforming to ATSC standards |
| 0x03 | ATSC_audio - The virtual channel carries audio programming (audio service and optional data) conforming to ATSC standards |
| 0x04 | ATSC_data_only_service - The virtual channel carries a data service conforming to ATSC standards, but no video of stream_type 0x02 or audio of stream_type 0x81 |
| 0x05 | Software Download Data Service – see A/97 |
| 0x06 | Unassociated/small screen service – see A/65C Amendment 1 |
| 0x07 | Parameterized Service – New A/V CODEC |
| 0x08 | ATSC_nrt_service — The virtual channel carries a NRT service conforming to ATSC standards |
| 0x09-0x7F | [ Reserved for future ] |
| 0x80-0xFF | [ User Private ] |

FIG. 7

| Syntax | No. of Bits | Format |
|---|---|---|
| data_service_table_bytes() { | | |
|     sdf_protocol_version | 8 | uimsbf |
|     application_count_in_section | 8 | uimsbf |
|     if(application_count_in_section > 0) { | | |
|         for(j = 0; j <application_count_in_section; j++) { | | |
|             compatibility_descriptor() | | |
|             app_id_byte_length | 16 | uimsbf |
|             if(app_id_byte_length > 1) { | | |
|                 app_id_description | 16 | uimsbf |
|                 for(i=0;i<app_id_byte_length-2;i++) { | | |
|                     app_id_byte | 8 | bslbf |
|                 } | | |
|             } | | |
|             tap_count | 8 | uimsbf |
|             for(i=0;i<tap_count; i++) { | | |
|                 protocol_encapsulation | 8 | uimsbf |
|                 action_type | 7 | uimsbf |
|                 resource_location | 1 | bslbf |
|             Tap() | | |
|                 tap_info_length | 16 | uimsbf |
|                 for(k=0; k<N; k++) { | | |
|                     descriptor() | | |
|                 } | | |
|             } | | |
|             app_info_length | 16 | uimsbf |
|             for(i=0; i<M; i++) { | | |
|                 descriptor() | | |
|             } | | |
|             app_data_length | 16 | uimsbf |
|             for(i=0; i<app_data_length; i++) { | | |
|                 app_data_byte | 8 | bslbf |
|             } | | |
|         } | | |
|     } | | |
|     service_info_length | 16 | uimsbf |
|     for(j=0; j<K; j++) | | |
|         descriptor() | | |
|     } | | |
|     service_private_data_length | 16 | uimsbf |
|     for(j=0; j<service_private_data_length; j++){ | | |
|         service_private_data_byte | 8 | bslbf |
|     } | | |
| } | | |

FIG. 10

| Syntax | No.of Bits | Format |
|---|---|---|
| NRT_service_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     NST_protocol_version | 8 | uimsbf |
|     reserved | 8 | '11111111' |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_NRT_services | 8 | uimsbf |
|   for (j=0;j< num_NRT_services; j++) | | |
|   { | | |
|     NRT_service_id | 16 | uimsbf |
|     reserved | 2 | '11' |
|     NRT_service_status | 2 | uimsbf |
|     SP_indicator | 1 | bslbf |
|     short_NRT_service_name_length /' m '/ | 3 | uimsbf |
|     short_NRT_service_name | 16*m | |
|     reserved | 2 | '11' |
|     NRT_service_category | 6 | uimsbf |
|     num_components | 5 | uimsbf |
|     IP_version_flag | 1 | bslbf |
|     source_IP_address_flag | 1 | bslbf |
|     NRT_service_destination_IP_address_flag | 1 | bslbf |
|     if (source_IP_address_flag) | | |
|       source_IP_address | 32 or 128 | uimsbf |
|     if (NRT_service_destination_IP_address_flag) | | |
|       NRT_service_destination_IP_address | 32 or 128 | uimsbf |
|     for (j=0;j< num_components; j++) | | |
|     { | | |
|       reserved | 1 | '1' |
|       essential_component_indicator | 1 | bslbf |
|       component_destination_IP_address_flag | 1 | bslbf |
|       port_num_count | 5 | uimsbf |
|       component_destination_UDP_port_num | 16 | uimsbf |
|       if (component_destination_IP_address_flag) | | |
|         component_destination_IP_address | 32 or 128 | uimsbf |
|       reserved | 4 | '1111' |

FIG. 11

| | | |
|---|---|---|
| num_component_level_descriptors | 4 | uimsbf |
| for (k=0;k< num_components_level_descriptors; k++) { | | |
|     component_level_descriptor() | var | |
| } | | |
| } | | |
| reserved | 4 | '1111' |
| num_NRT_service_level_descriptors | 4 | uimsbf |
| for (m=0; m<num_NRT_service_level_descriptors; m++) { | | |
|     NRT_service_level_descriptor() | var | |
| } | | |
| } | | |
| reserved | 4 | '1111' |
| num_virtual_channel_level_descriptors | 4 | uimsbf |
| for (n=0; n<num_virtual_channel_level_descriptors; n++) { | | |
|     virtual_channel_level_descriptor() | var | |
| } | | |
| } | | |

FIG. 12

| Syntax | No.of Bits | Format |
|---|---|---|
| NRT_component_descriptor() { | | |
|     descriptor_tag | 8 | 0 x CB |
|     descriptor_length | 8 | uimsbf |
|     component_type | 7 | uimsbf |
|     component_encryption_flag | 1 | |
|     if (component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     NRT_component_data(component_type) | var | |
| } | | |

FIG. 13

| Syntax | No.of Bits | Format |
|---|---|---|
| NRT_component_data() { | | |
|     TSI | 16 | uimsbf |
|     session_start_time | 32 | uimsbf |
|     session_end_time | 32 | uimsbf |
|     reserved | 5 | '11111' |
|     tias_bandwidth_indicator | 1 | bslbf |
|     as_bandwidth_indicator | 1 | bslbf |
|     FEC_OTI_indicator | 1 | bslbf |
|     if (tias_bandwidth_indicator == '1') { | | |
|         tias_bandwidth | 16 | uimsbf |
|     } | | |
|     if (as_bandwidth_indicator == '1') { | | |
|         as_bandwidth | 16 | uimsbf |
|     } | | |
|     if (FEC_OTI_indicator == '1') { | | |
|         FEC_encoding_id | 8 | uimsbf |
|         FEC_instance_id | 16 | uimsbf |
|     } | | |
| } | | |

FIG. 14

| Syntax | No. of Bits | Format |
|---|---|---|
| NRT_information_table_section() { | | |
| table_id | 8 | 0xTBD |
| section_syntax_indicator | 1 | '1' |
| private_indicator | 1 | '1' |
| reserved | 2 | '11' |
| section_length | 12 | uimsbf |
| service_id | 16 | uimsbf |
| reserved | 2 | '11' |
| NRT_IT_version_number | 5 | uimsbf |
| current_next_indicator | 1 | '1' |
| section_number | 8 | uimsbf |
| last_section_number | 8 | uimsbf |
| protocol_version | 8 | uimsbf |
| time_span_start | 32 | uimsbf |
| reserved | 5 | '11111' |
| time_span_length | 11 | uimsbf |
| num_items_in_section | 8 | uimsbf |
| for (j=0; j< num_items_in_section; j++) { | | |
|   content_linkage | 32 | uimsbf |
|   updates_available | 1 | bslbf |
|   content_version_available | 1 | bslbf |
|   TF_available | 1 | bslbf |
|   low_latency | 1 | bslbf |
|   playback_length_in_seconds | 20 | uimsbf |
|   if (content_version_available==1) { | | |
|     content_version_number | 16 | uimsbf |
|   } | | |
|   content_length_included | 1 | bslbf |
|   playback_delay_included | 1 | bslbf |
|   expiration_included | 1 | bslbf |
|   reserved | 1 | '1' |
|   duration | 12 | uimsbf |

FIG. 15

| Syntax | No. of Bits | Format |
|---|---|---|
| if (content_length_included==1) { | | |
|     content_length | 40 | uimsbf |
| } | | |
| if (playback_delay_included==1) { | | |
|     reserved | 4 | '1111' |
|     playback_delay | 20 | uimsbf |
| } | | |
| if (expiration_included==1) { | | |
|     expiration | 32 | uimsbf |
| } | | |
| content_name_length | 8 | uimsbf |
| content_name_text() | var | |
| reserved | 4 | '1111' |
| content_descriptors_length | 12 | uimsbf |
| for (i=0; i<N; i++) { | | |
|     content_descriptor() | | |
|     } | | |
| } | | |
| reserved | 6 | '111111' |
| descriptors_length | 10 | uimsbf |
| for (i=0; i<M; i++) { | | |
|     descriptor() | | |
|     } | | |
| } | | |

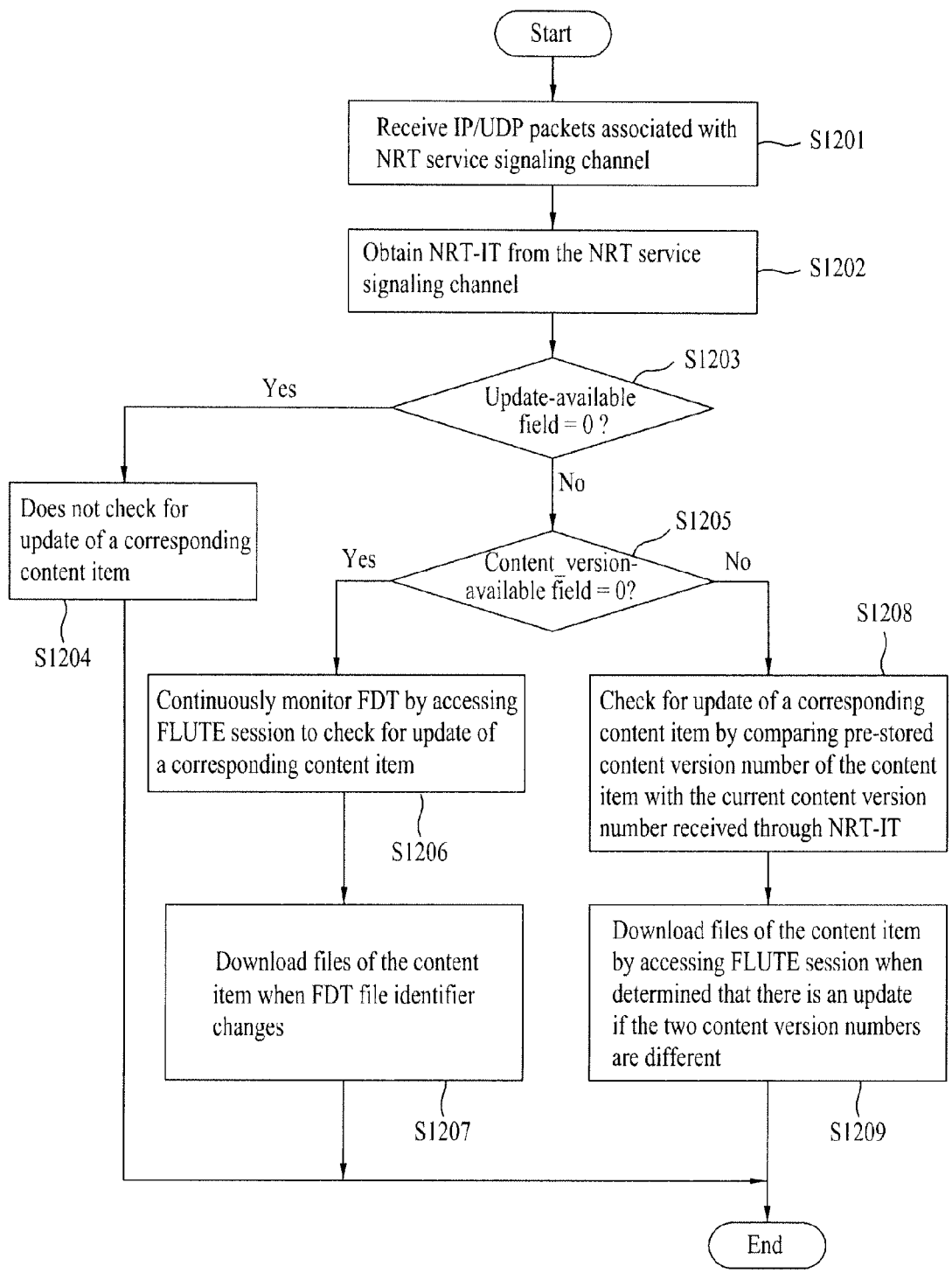

FIG. 17

| Syntax | No. of Bits | Format |
|---|---|---|
| content_version_table_section() { | | |
|     table_id | 8 | 0xTBD |
|     section_syntax_indicator | 1 | '1' |
|     private_indicator | 1 | '1' |
|     reserved | 2 | '11' |
|     section_length | 12 | uimsbf |
|     service_id | 16 | uimsbf |
|     reserved | 2 | '11' |
|     CVT_version_number | 5 | uimsbf |
|     current_next_indicator | 1 | '1' |
|     section_number | 8 | uimsbf |
|     last_section_number | 8 | uimsbf |
|     CVT_protocol_version | 8 | uimsbf |
|     num_items_in_section | 8 | uimsbf |
|     for (j=0; j< num_items_in_section; j++) { | | |
|         content_linkage | 32 | uimsbf |
|         content_version_number | 16 | bslbf |
|     } | | |
| } | | |

FIG. 19

| Syntax | No. of Bits | Format |
|---|---|---|
| CVT_location_descriptor() {<br>    descriptor_tag<br>    descriptor_length<br>    CVT_UDP_port<br>    CVT_IP_address<br>} | <br>8<br>8<br>16<br>32 or 128 | <br>0xTBD<br>uimsbf<br>uimsbf<br>uimsbf |

FIG. 21

| Content |
|---|
| id<br>version<br>validFrom<br>validTo<br>globalContentID<br>baseCID<br>ServiceReference<br>    idRef<br>    weight<br>Name<br>Description<br>StartTime<br>EndTime<br>AudioLanguage<br>    languageSDPTag<br>TextLanguage<br>    languageSDPTag<br>Length<br>ParentalRating<br>    ratingSystem<br>    ratingValueName<br>Genre<br>Extension<br>    url<br>    Description<br>PreviewDataReference<br>    idRef<br>    usage<br>PrivateExt<br>    UpdatesAvailable<br>    ContentEncoding<br>    ConentLinkage<br>    ContentType<br>    DescriptiveTags<br>    RequiredStorage |

METHOD OF PROCESSING NON-REAL TIME SERVICE AND BROADCAST RECEIVER

This application claims the benefit of U.S. Provisional Application Nos. 61/115,888, filed on Nov. 18, 2008; 61/121, 178 filed on Dec. 9, 2008; 61/121,181 filed on Dec. 9, 2008; 61/138,494 filed on Dec. 17, 2008; 61/153,973 filed on Feb. 20, 2009; 61/153,985 Feb. 20, 2009; 61/179,005 filed on May 17, 2009; 61/236,138 Aug. 23, 2009; 61/236,859 filed on Aug. 25, 2009 and 61/258,596 filed on Nov. 6, 2009, which are hereby incorporated by reference.

BACKGROUND OF THE INVENTION

1. The Field

The present disclosure relates to a method for processing non-real time service and broadcast receiver thereof.

2. Description of the Related Art

A digital television (DTV) can not only provide video and audio services which are conventional TV services, but can now also provide various other services. For example, the DTV can provide an Electronic Program Guide (EPG) or the like to the user and can simultaneously provide broadcast services received through 2 or more channels. Especially, the number of services that a reception system can provide has been significantly increased since the reception system has been equipped with a large-capacity storage device and has been connected to the Internet or data communication channels which enable bidirectional communication.

SUMMARY OF THE INVENTION

An object of the present is to provide a method of receiving a non-real time service and the broadcast receiver thereof.

Another object of the present invention is to provide a method of processing a non-real time service and the broadcast receiver for easily identifying the changes in the content which configures the non-real time service in the IP level.

Another object of the present invention is to provide a method of processing a non-real time service for easily identifying update information of a corresponding content by including the update information of the content in the signaling information table and the broadcast receiver thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the objectives according to an embodiment of the present invention provides a method of processing a Non-Real Time (NRT) service in a broadcast receiver the steps may include receiving and processing signaling information including content detail information and content update information, receiving a content including at least one file through NRT and storing the received content in a storage media, identifying update availability of the content based on the content update information included in the signaling information, and receiving at least one file included in the content by accessing a File Delivery over Unidirectional Transport (FLUTE) session transmitting the content when the update is available.

The content update information includes a first field identifying a content version number of the content in the signaling information and a second field indicating the content version number according to a value of the first field.

Herein, identifying update availability checks the update availability of the content by comparing the content version number indicated in the second field with a previous content version number of the content.

The content update information includes a third field indicating whether the content is an updatable content.

According to another embodiment of the present invention, a method of processing a Non-Real Time (NRT) service in a broadcast receiver, the steps may include receiving and processing first signaling information including content access information and second signaling information including content detail information, receiving and processing third signaling information including content update information, receiving and storing a content including at least one file through NRT based on the first signaling information and the second signaling information, identifying update availability of the content based on the content update information included in the third signaling information, and receiving at least one file included in the content by accessing a File Delivery over Unidirectional Transport (FLUTE) session transmitting the content when the update is available.

Access information of the first signaling information, the second signaling information and the third signaling information have a same predetermined Internet Protocol (IP) address and a same User Datagram Protocol (UDP) port number.

Access information of the first signaling information and the second signaling information have a same predetermined Internet Protocol (IP) address and a same User Datagram Protocol (UDP) port number, and access information of the third signaling information is included in the first signaling information.

The content update information includes a first field indicating identification information of the content and a second field indicating a content version number of the content.

Herein, identifying update availability checks the update availability of the content by comparing the content version number indicated in the second field with a previous content version number of the content.

According to an embodiment of the present invention, the broadcast receiver may include a first, second and third processor. The first processor receives and processes first signaling information including content access information, second signaling information including content detail information, and third signaling information including content update information. The second processor receives a content including at least one file through NRT based on the first signaling information and the second signaling information and stores the received content in a storage media. The third processor identifies update availability of the content based on the content update information included in the third signaling information and receives at least one file included in the content by accessing a File Delivery over Unidirectional Transport (FLUTE) session transmitting the content when the update is available.

Access information of the first, second and third signaling information have a same predetermined Internet Protocol (IP) address and same User Datagram Protocol (UDP) port number.

Access information of the first and second signaling information have a same predetermined Internet Protocol (IP) address and same User Datagram Protocol (UDP) port number, and access information of the third signaling information is included in the first signaling information.

The content update information includes a first field indicating identification information of the content and a second field indicating a content version number of the content.

The third processor identifies the update availability of the content by comparing the content version number indicated in the second field with a previous content version number of the content.

Other objects, features, and advantages of the present invention will be apparent through a detailed description of the embodiments with reference to the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 illustrates an embodiment of a bitstream syntax structure of a virtual channel table according to the present invention;

FIG. 5 illustrates an embodiment of service type field values in the virtual channel table of FIG. 4 and respective meanings of the values;

FIG. 6 illustrates another embodiment of values allocated to a service type field in the virtual channel table of FIG. 4 and respective meanings of the values;

FIG. 7 illustrates an embodiment of a bitstream syntax structure of a data service table (DST) of the present invention;

FIG. 10 and FIG. 11 illustrate a bitstream syntax structure of a Non-Real Time Service Table (NST) according to the present invention;

FIG. 12 illustrates a bitstream syntax structure of a component_descriptor( ) according to an embodiment of the present invention;

FIG. 13 illustrates a bitstream syntax of FLUTE file delivery data using the component_descriptor( );

FIG. 14 and FIG. 15 illustrate a bitstream syntax structure of a Non-Real Time Information Table (NRT-IT) according to an embodiment of the present invention;

FIG. 16 is a flowchart of the process of identifying and handling the update of the content item using the NRT-IT section according to the present invention;

FIG. 17 illustrates a bitstream syntax structure of a CVT section according to the present invention;

FIG. 19 illustrates a bitstream syntax structure of a CVT_location_descriptor( ) included in the service level descriptor of the NST according to the present invention;

FIG. 21 illustrates a bitstream syntax structure of a content fragment of OMA BOAST according to an embodiment of the present invention.

DESCRIPTION OF THE PREFERRED EMBODIMENTS

Figure 1:
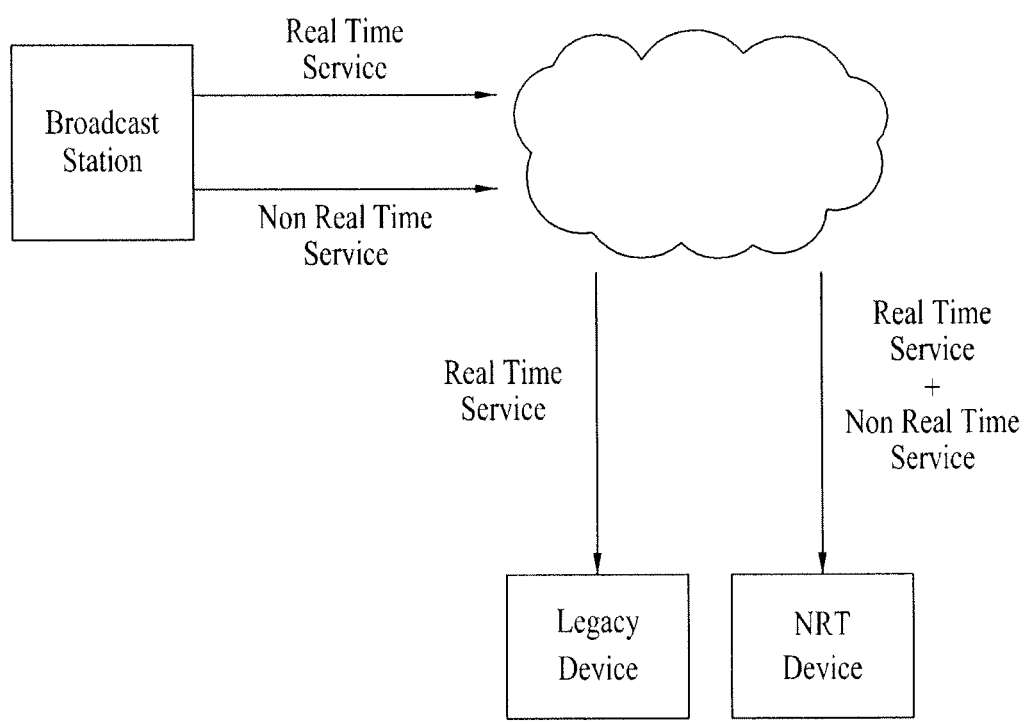
FIG. 1 illustrates a conceptual diagram of providing a real-time (RT) service and a non-real time (NRT) service.

Preferred embodiments of the invention, which can achieve the above objects, will now be described with reference to the accompanying drawings. The configuration and operation of the invention, illustrated in the drawings and described below with reference to the drawings, will be described using at least one embodiment without limiting the spirit and the essential configuration and operation of the invention.

Although most terms of elements in the present invention have been selected from general ones widely used in the art taking into consideration their functions in the invention, the terms may be changed depending on the intention or convention of those skilled in the art or the introduction of new technology. Some terms have been arbitrarily selected by the applicant and their meanings are explained in detail in the following description as needed. Thus, the definitions of the terms used in the invention should be determined based on the whole content of this specification together with the intended meanings of the terms rather than their simple names or meanings.

The term real time (RT) service used in the present invention actually means the real-time service. In other words, it is restricted in time. On the other hand, non-real time (NRT) service refers to non-real time, not RT, service. Thus, NRT service is not restricted in time. Further the data used in NRT service is referred to as NRT service data.

A broadcast receiver according to the present invention receives NRT service through terrestrial, cable, internet, and the like.

The NRT service is stored in a storage medium of the broadcast receiver and then it is displayed through a display according to a time specified by the user or at the user's request. The NRT service is received and stored in a file format according to an embodiment. In an embodiment, the storage medium is an internal HDD attached to the inner part of the broadcast receiver. In another embodiment, the storage medium may be Universal Serial Bus (USB) memory or an external HDD connected externally with the broadcast receiver.

In order to receive and store the files configuring the NRT service and provide service to the user, signaling information is needed. The signaling information is referred to NRT service signaling information or NRT service signaling data according to the present invention.

According to the method of receiving IP datagram, NRT service can be divided into Fixed NRT service and Mobile NRT service. More specifically, the Fixed NRT service is provided through fixed broadcast receiver, and Mobile NRT service is provided through mobile broadcast receiver.

According to an embodiment of the present invention, Fixed NRT service is explained in detail. However, the present invention can also be obviously applied to Mobile NRT service as well.

FIG. 1 illustrates a conceptual diagram of how a RT and an NRT service are provided.

The broadcast station, following the conventional method, transmits the current terrestrial broadcast (or mobile broadcast) RT service. At this juncture, the broadcast station may provide NRT service using the extra bandwidth or a specific bandwidth left after sending the RT service. Thus, RT service and NRT service are transmitted through a same or a different channel. Therefore, a broadcast receiver can be divided into RT service and NRT service, and in order to provide the user with the NRT service when needed, NRT service signaling information (or NRT service signaling data) is required. The NRT service signaling information (or NRT service signaling data) will be described below in detail.

For example, a broadcast station can transmit broadcast service data in real time and transmit news clips, weather information, advertisements, push VOD, or the like in non-real time. The NRT service may not only provide such news clips, weather information, advertisements, and push VOD, but may also provide specific scenes and detailed information on specific program from a real-time broadcast service.

A conventional broadcast receiver (i.e., a legacy device) can receive and process RT services but cannot receive and process NRT services. Thus, it is a principle that the process of the conventional broadcast receiver (i.e., a legacy device) is not affected by NRT stream included in the transmission of RT service. In other words, the conventional broadcast receiver does not have a method of handling the NRT service even if it is received.

However, the broadcast receiver (i.e., an NRT device) according to an embodiment of the present invention can combine NRT services and RT services to provide a variety of services to the user compared to the convention receiver.

Figure 2:
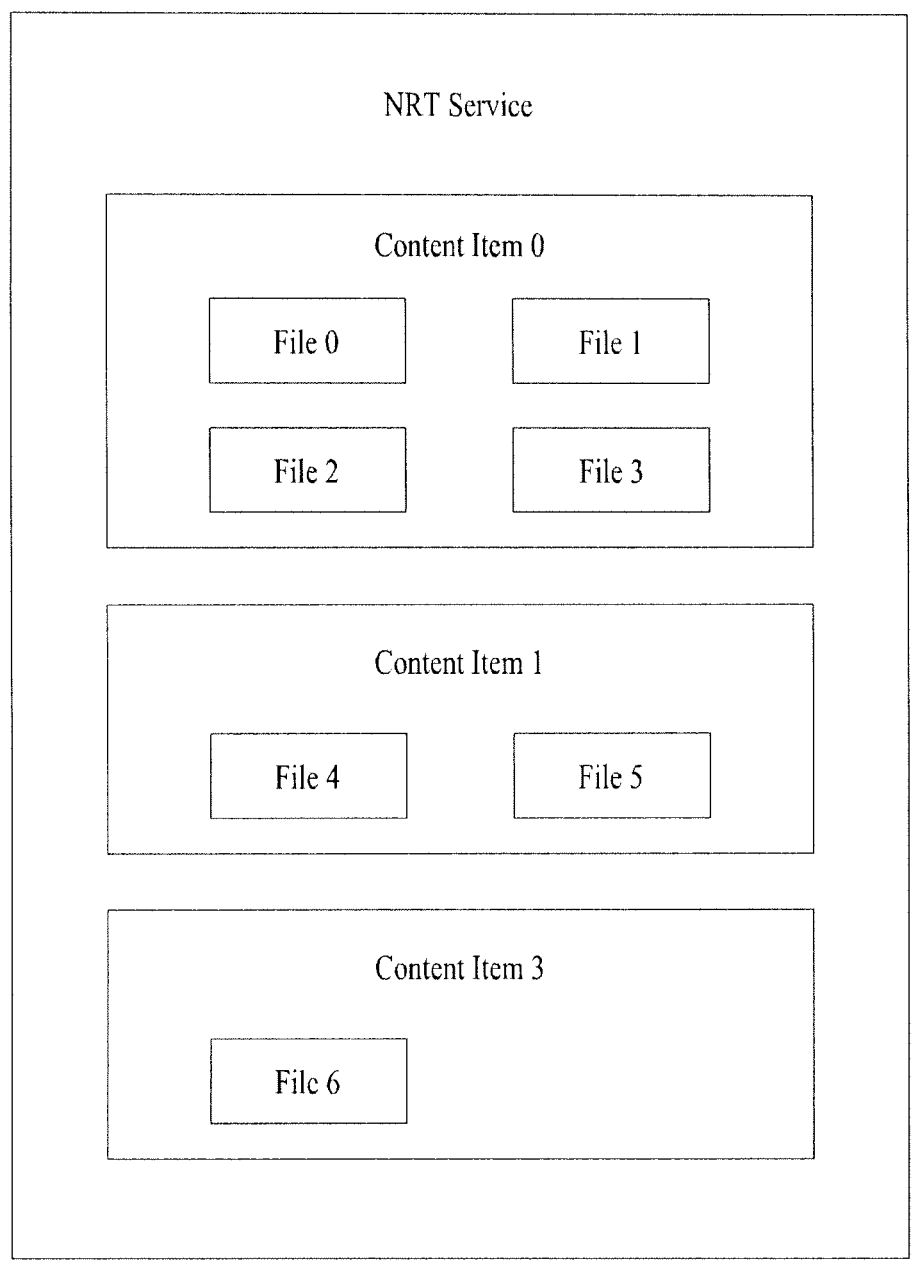
FIG. 2 is a diagram illustrating the relationship between an NRT service, content item, and files.

In an embodiment, one NRT service according to the present invention includes one or more content item (or content or NRT content) and one content item includes one or more files as shown in FIG. 2. The terms "file" and "object" have the same meaning in the description of the present invention.

The content item is the minimum unit that can be presented independently. For example, when a news program, which includes an economic news section, a political news section, and a life news section, is provided in non-real time, the news program may be an NRT service and each of the economic news section, the political news section, and the life news section may be the content item. And each of the economic news section, the political news section, and the life news section may include at least one file.

The NRT service can be transmitted in an MPEG-2 Transport Stream (TS) packet format through a dedicated broadcast channel or the same broadcast channel as the RT service. In this case, a unique PID is transmitted after being allocated to a TS packet of the NRT service data in order to identify the NRT service. In an embodiment of the present invention, IP-based NRT service data is packetized into an MPEG-2 TS packet for transmission.

The NRT service signaling data required to receive the NRT service data is transmitted through an NRT service signaling channel. The NRT service signaling channel is transmitted through a specific IP stream in the IP layer. Here, the IP stream is also packetized into an MPEG-2 TS packet for transmission. The NRT service signaling data transmitted through an NRT service signaling channel includes NRT Service Map Table (NST) and NRT Information Table (NRT-IT). In an embodiment of the present invention, the NST provides the access information of at least one NRT service and at least one content item/file that forms NRT services that operate in the IP layer. In one embodiment of the present invention, NRT-IT provides detailed information of the content item/file that forms NRT service. In the present invention, the NST and the NRT-IT may be referred to as Signaling Information Table.

Figure 3:
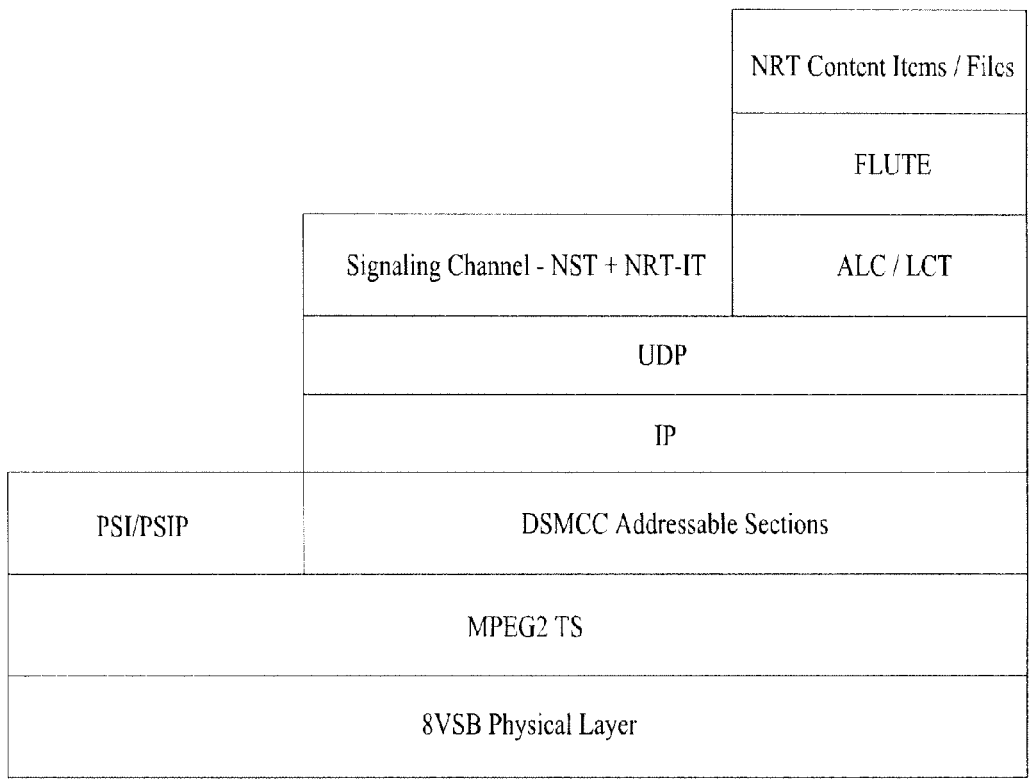
FIG. 3 illustrates an embodiment of a protocol stack for a fixed NRT service according to the present invention.

FIG. 3 illustrates a diagram for a protocol stack of an NRT service configured according to an embodiment of the present invention.

In an embodiment of the present invention, for fixed NRT service, the file-type NRT service is packetized according to an IP scheme in the IP layer and then transmitted through a specific virtual channel in an MPEG-2 TS format.

In an embodiment of the present invention, as an example of the MPEG-2 based Program Specific Information/Program and System Information Protocol (PSI/PSIP) table, the presence of the NRT service or the identification information of the NRT service may be signaled through the virtual channel in the Virtual Channel Table (VCT).

In an embodiment of the present invention, the NRT service signaling channel that transmits NRT service signaling data which signals the access information of the IP based NRT service is transmitted in an MPEG-2 TS format after being packetized according to an IP stream in the IP layer through a specific virtual channel.

More specifically, in the broadcast station, NRT content/files are packetized according to a file transfer protocol scheme and are again packetized according to an Asynchronous Layered Coding/Layered Coding Transport (ALC/LCT) scheme as shown in FIG. 3. The packetized ALC/LCT data is again packetized according to an UDP scheme and the packetized ALC/LCT/UDP data is again packetized into ALC/LCT/UDP/IP data according to an IP scheme. In the present invention, the packetized ALC/LCT/UDP/IP data is referred to as an "IP datagram" for ease of explanation.

In addition, NRT service signaling data required to receive the NRT content/files is transmitted through an NRT service signaling channel. Here, the NRT service signaling channel is packetized according to a User Datagram Protocol (UDP) scheme and the packetized UDP data is again packetized into UDP/IP data according to an IP scheme. In the present invention, the UDP/IP data is also referred to as an "IP datagram" for ease of explanation. In an embodiment, multicast of the NRT service signaling channel is achieved after being encapsulated in an IP datagram having a well-known IP destination address and a well-known destination UDP port number.

In an embodiment of the present invention, IP datagrams of the NRT service signaling channel and the NRT service are encapsulated in an addressable section structure and again packetized in an MPEG-2 TS format. So, one addressable section structure has a format in which a section header and a CRC checksum are added to one IP datagram. This addressable section structure format complies with a Digital Storage Media Command and Control (DSM-CC) section format for private data transmission. Thus, the addressable section is also referred to as a "DSM-CC addressable section." A 188-byte MPEG-2 TS packet can be created by dividing the addressable section data into 184-byte units and adding a 4-byte MPEG header to each 184-byte unit. At this time, a value allocated to a PID of the MPEG header is a unique value that can identify TS packets that carry the NRT service signaling channel and the NRT service.

Program Specific Information (PSI) and Program and System Information Protocol (PSIP) table section data is also packetized into MPEG-2 TS packets.

An embodiment of the PSI table may include a Program Map Table (PMT), a Program Association Table (PAT), or the like and an embodiment of the PSIP table may include a Virtual Channel Table (VCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), and a Master Guide Table (MGT).

The MPEG-2 TS packets are modulated according to a predetermined transmission scheme, for example, a VSB transmission scheme, in a physical layer and are then transmitted to the reception system.

In an embodiment of the present invention, the transmission of an NRT service is determined by signaling through a PSI/PSIP table. For example, whether or not an NRT service is transmitted is signaled in a Virtual Channel Table (VCT).

FIG. 4 illustrates a syntax structure of the Virtual Channel Table (VCT) section according to an embodiment.

The VCT section, taking information about the virtual channel for example, transmits information of channel information for channel selection and PID information for receiving audio and/or video. Thus, when the VCT section is parsed, the PID of the audio and video of the broadcast program transmitted within the channel along with the channel number and channel name is known.

The VCT section syntax includes at least one of table_id field, section_syntax_indicator field, private_indicator field, section_length field, transport_stream_id field, version_number field, current_next_indicator field, section_number field, last_section_number field, protocol_version field, num_channels_in_section field.

The VCT section syntax further includes first 'for' loop (virtual channel loop) which repeats for the number indicated in the num_channels_in_section field value, the first loop includes at least one of short_name field, major_channel_number field, minor_channel_number field, modulation_ode field, carrier_frequency field, channel_TSID field, program_number field, ETM_location field, access_controlled field, hidden field, service_type field, source_id field, descriptor_length field, or second 'for' loop which repeats for the number of the descriptors included in the first loop. For the convenience of explanation in the present invention, the second loop is referred to as the first descriptor loop. The descriptor( ) included in the first descriptor loop is a descriptor applied in each virtual channel.

The VCT section syntax may further include a third 'for' loop which repeats for the number of value indicated by additional_descriptor_length field and the number of descriptor added in the VCT section. For the convenience of explanation in the present invention, the third loop is referred to as the second descriptor loop. The additional_descriptors( ) included in the second descriptor loop is applied to all the descriptors described in the virtual channel of the VCT section.

A table_id field illustrated in FIG. 4 indicates a unique identifier or identification (ID) which identifies that the information transmitted through the table is VCT. More specifically, the table_id field indicates a value informing that the table corresponding to this section is a VCT. For example, a 0xC8 value may be given to the table_id field.

A version_number field indicates the version number of the VCT, the section_number field indicates the number of this section, and the last_section_number field indicates the number of the last section of a complete VCT. The num_channels_in_section field designates the number of the overall virtual channel existing within the VCT section.

A short_name field in the first 'for' loop indicates the name of a virtual channel. The major_channel_number field indicates a 'major' channel number associated with the virtual channel defined within the first loop and the minor_channel_number field indicates 'minor' channel number. Thus, each channel number should be connected to the major and minor channel numbers, and the major and minor channel numbers are used as user reference numbers for the corresponding virtual channel.

A program_number field is shown for connecting the virtual channel having an MPEG-2 program association table (PAT) and program map table (PMT), and matches the program number within the PAT/PMT. Here, the PAT describes the elements of a program corresponding to each program number, and the PAT indicates the PID of a transport packet transmitting the PMT. The PMT describes the affiliated information and the PID list of the transport packet in which the identification number and the audio/video information of a program is transmitted in bit sequence.

A service_type field indicates the service type within the corresponding virtual channel.

In an embodiment, the virtual channel may include at least one RT service and at least one NRT service including audio and/or video.

In this case, service type values may be allocated as shown in FIG. 5 and a value of 0x04 representing an ATSC-data-only service may be used to indicate that an NRT service is provided through the virtual channel.

In another embodiment, the virtual channel may only include one or more NRT service. In such a case, as shown in FIG. 6, a new service_type field value of 0x08 may be defined to indicate that an NRT service is provided through the virtual channel.

A source_id field indicates a program source connected to the corresponding virtual channel.

The term "source" refers to a specific source such as a video, text, data or audio source. The source_id field has a unique value in a transport stream in which a VCT is transmitted.

On the other hand, data service table (DST) may be received through PID included in the service_location_descriptor of the VCT, and through the DST, the types of the application and the detailed information of the data broadcast stream transmitted through the channel is known.

In the present invention, NRT application (NRT service) is identified through the DST.

FIG. 7 illustrates the DST section syntax structure according to an embodiment.

A sdf_protocol_version field (8-bit) indicates the version of the Service Description Framework protocol.

An application_count_in_section field (8-bit) indicates the number of applications listed within the DST section.

A compatibility_descriptor( ) field indicates that the corresponding structure includes DSM-CC compatible descriptor. The object is to signal the compatibility requests of the application of the platform received to determine the ability to use the corresponding data service.

An app_id_byte_length field (16-bit) indicates the number of bytes used to identify the application.

An app_id_description field (16-bit) indicates the format and the semantics of the next application identification bytes. As described in the table 1 below, '0x0003' is newly assigned to identify that the corresponding application is an NRT application. The assigned value of '0x0003' is just an exemplary value and the scope of this application is not limited to the value.

TABLE 1

| Value | Application Identifier Format |
|---|---|
| 0x0000 | DASE application |
| 0x0001 | ATSC reserved |
| 0x0002 | ATSC A/92 Application |
| 0x0003 | NRT Application |
| 0x0004-0x7FFF | ATSC reserved |
| 0x8000-0xFFFF | User private |

An app_id_byte field (8-bit) describes the byte of the application identifier.

A tap_count field (8-bit) indicates the number of Tap( ) structure used by the corresponding application.

A protocol_encapsulation field (8-bit) indicates the type of the protocol encapsulation used to transmit the specific data element in reference with the Tap( ) field.

An action_type field (7-bit) instructs the character of the data in reference with the Tap( ) field.

A resource_location field (1-bit) indicates the location of the association_tag field that matches the association_tag value listed within the next Tap structure. If the value of the corresponding field is '0,' then the matching association_tag exist in the PMT of the current MPEG-2 program. Oppositely, if the value is '1,' then the matching association_tag exists in the DSM-CC Resource Descriptor in the Network Resources Table of the corresponding data service.

A Tap( ) field, for example, is defined in a unique structure including the following. The tap_id field (16-bit) is used by the application to identify the data elements. The range of the value of tap_id is determined by the app_id_byte fields related to Tap( ) within the DST. The value of tap_id is selected by the data service provider. Further, it is used in application to handle the data elements.

A Use field (16-bit) is used to specify the communication channel referenced by the association_tag.

An association_tag field (16-bit) uniquely identifies one from the listed DSM-CC resource descriptor within the Network Resource Table or listed data elementary stream within the PMT.

A Selector( ) field indicates a unique data element that can be used in the communication channel referenced by association_tag field or in the data elementary stream.

A tap_info_length field (16-bit) indicates the number of bytes of the descriptors of the next field of the corresponding field.

A tap_info_length field (16-bit) indicates the number of bytes of the descriptors of the next field of the corresponding field.

An app_info_length field (8-bit) indicates number of bytes of the descriptor of the next corresponding field.

A descriptor( ) field follows the descriptor format.

An app_data_length field (16-bit) indicates length of the app_data_byte fields in bytes.

An app_data_byte (8-bit) describes the private data fields different from input parameters associated with the application as 1 byte.

A service_info_length field (8-bit) indicates number of byte unit of the next descriptors.

A descriptor( ) field follows the descriptor format.

A service_private_data_length field (16-bit) indicates length of byte unit of the private fields.

A service_private_data_byte field (8-bit) describes the private fields as 1 byte.

Figure 8:
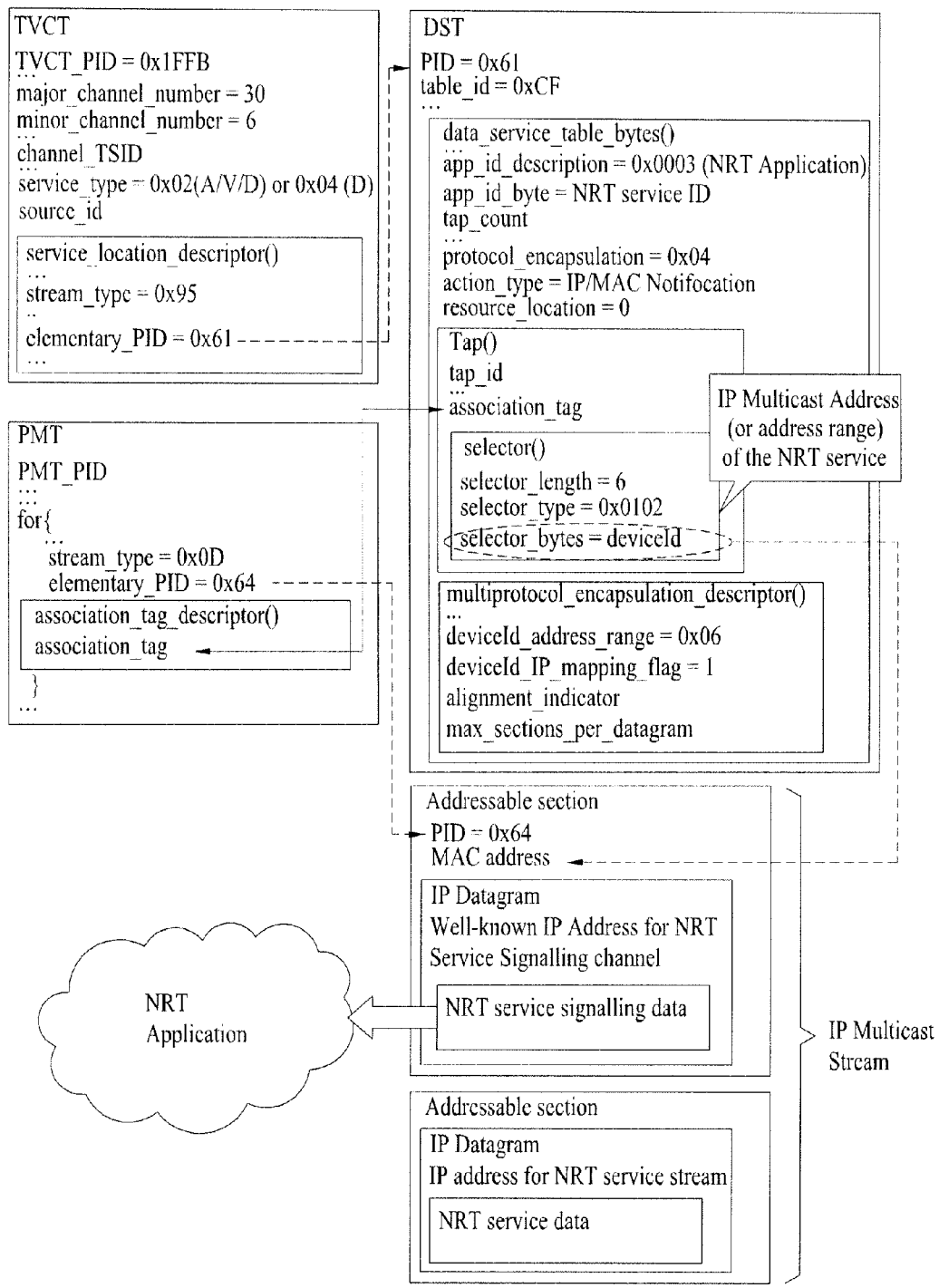
FIG. 8 illustrates an embodiment of a procedure for obtaining access information of an IP stream that carries an NRT service signaling channel using a PSI/PSIP table according to the present invention.

FIG. 8 illustrates a method in which an NRT service is received and provided using an ATSC A/90 standard for carrying (or transmitting) a data broadcast stream and an ATSC A/92 standard for transmitting an IP multicast stream in a broadcast receiver according to the present invention.

Namely, information of a stream that constitutes each virtual channel is signaled in an ES_loop of a PMT or a service location descriptor of a VCT. For example, an NRT service stream can be transmitted through the virtual channel in the case where the service type of the VCT is 0x02 (i.e., digital A/V Data), 0x04 (i.e., data only), or 0x08 (i.e., NRT only service), as shown in FIG. 5 or FIG. 6. At this time, when the stream_type field included in the service location descriptor (or the ES loop of the PMT) has a value allocated 0x95 (i.e., DST transmission), this indicates that a data broadcast is transmitted. A normal A/V is transmitted if the service location descriptor has no value for stream_type field or does not have a value of 0x95 allocated. Therefore, if the stream_type field included in the service location descriptor has a value of 0x95, the Elementary_PID field value is a PID of a Data Service Table (DST). Thus, the DST can be received through the Elementary_PID field.

The type of the application and details of a data broadcast stream transmitted through this channel can be determined through the DST. In the present invention, an NRT application (i.e., an NRT service) is identified using the DST.

That is, an App_id_description field of the DST specifies the format and analysis of application identification bytes subsequent to this field. In an embodiment of the present invention, '0x0003' is allocated to the App_id_description field in order to identify the NRT application. The illustrated value (number) is only an example and does not limit the scope of the present invention.

If the App_id_description field value is '0x0003', an Application_id_byte value subsequent to this field is a service ID of the NRT application. A service ID of the NRT application may have a URI value that globally and uniquely identifies the corresponding service.

After the NRT application is identified as described above, a PID of an MPEG-2 TS packet separated from the IP datagram of the NRT service signaling channel is located through the Tap information. Then, an IP datagram that carries the NRT service signaling channel can be obtained from MPEG-2 TS packets having the PID found through the tap information and NRT service signaling data can be obtained from the obtained IP datagram. Here, well-known IP access information, i.e., a well-known IP address and a well-known UDP port number can be used as the IP access information of the NRT service signaling channel.

That is, an asynchronous IP stream is transmitted if a Protocol_encapsulation field value in the DST is 0x04 and a device_id value indicating the destination address is transmitted through a selector_bytes value if a Selector_type field value is 0x0102. A multiprotocol_encaplsulation_descriptor is used in order to accurately analyze the selector_bytes value and signals the number of valid bytes included in the device_id value. As a result, IP multicasts address (or address range) of the NRT service signaling channel transmitted through the PID can be determined through the Tap information.

Accordingly, the IP multicast address (or address range) is accessed and an IP stream, i.e., an IP packet, is received and NRT service signaling data is extracted from the received IP packet.

NRT service data, i.e., NRT content/files, is received based on the extracted NRT service signaling data and the received data can be stored in a storage medium or can be displayed on a display.

In another embodiment of the present invention, the NRT service can be signaled using a new value, for example, 0x96 instead of 0x95 as the stream type field value of the DST. This embodiment aims to eliminate the risk that the conventional receiver may malfunction with the NRT service which is a new application, in the case where the conventional receiver operates by determining whether or not a data broadcast stream is present based only on whether or not a stream having a stream type value of 0x95 is present. In this case, if a new stream type is defined, it will be possible to allow the conventional receiver to ignore this stream type, thereby guaranteeing backward compatibility.

Figure 9:
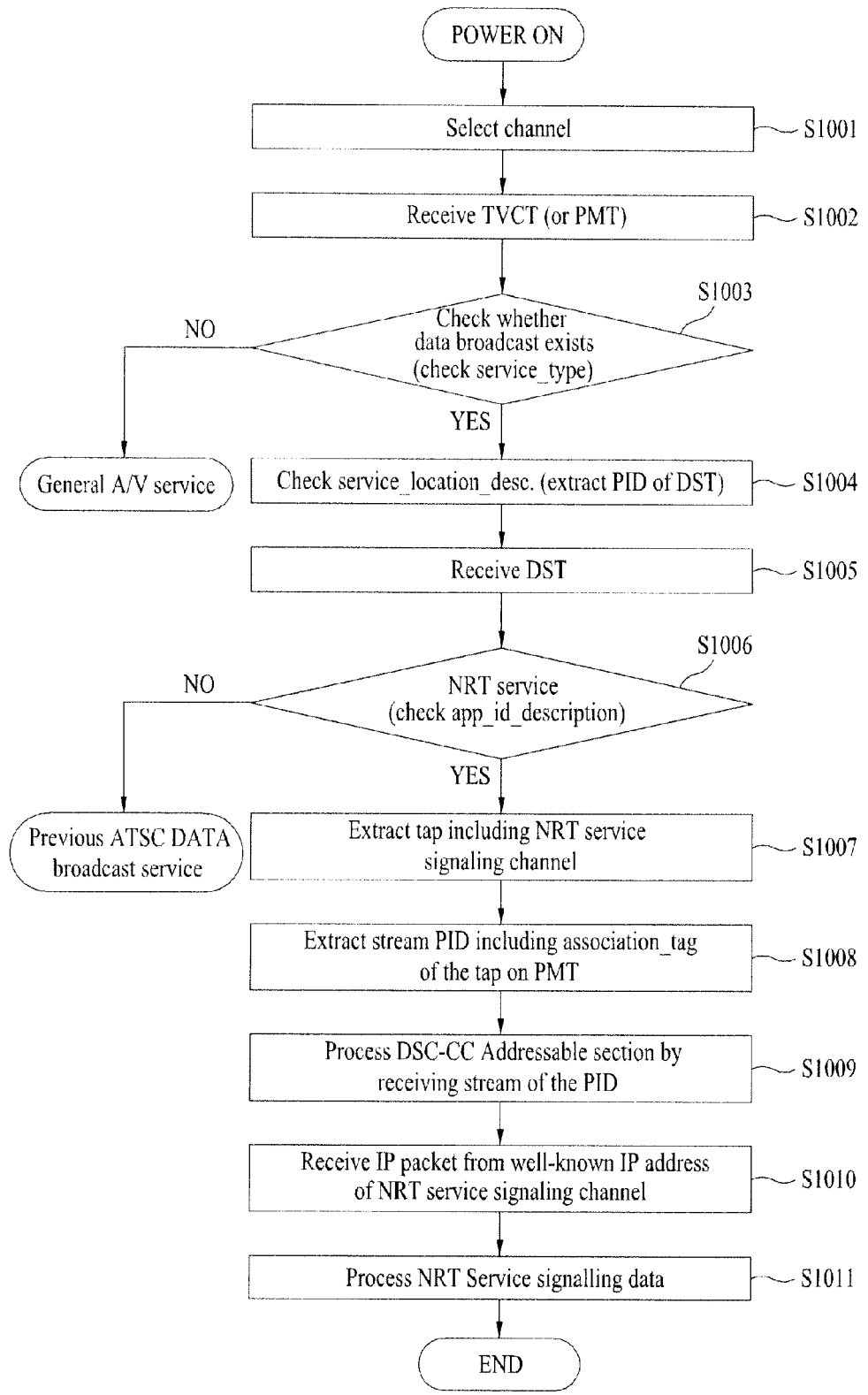
FIG. 9 is a flowchart illustrating a procedure for obtaining access information of an IP stream that carries an NRT service signaling channel using a PSI/PSIP table according to an embodiment of the present invention.

FIG. 9 is a flowchart illustrating the process of NRT service signaling data and the process of extracting the NRT service data.

In an embodiment, as shown in FIG. 9, the service_type field in the VCT has a value of 0x08 as in FIG. 6, indicating that at least one NRT service is transmitted through the relevant virtual channel.

After a power of a receiver has been turned on, if a default channel or a channel by a user is selected [S1001], the receiver receives a VCT or a PMT [S1002]. And then the receiver determines whether NRT service exists or not by parsing the VCT [S1003]. This can be done through looking at the service_type in the received virtual channel loop within the VCT. The [S1001] step is processed in the tuner and the [S1002]/[S1003] step is processed in the PSI/PSIP section handler.

For instance, if a value of the service_type is not set to '0x08', the relevant virtual channel will not transmit NRT service. The virtual channel will then transmit conventional service (i.e., legacy ATSC service), the receiver processes according to the information included in the virtual channel.

If the service_type field has a value of 0x08, the virtual channel will transmit NRT service. In such a case, service location descriptor in the virtual channel of the VCT is parsed to extract the PID of DST [S1004]. Then, using the extracted PID, DST is received [S1005]. The [S1004] and [S1005] step is processed through the demultiplexer controlled by the service manager.

It is then determined whether the corresponding service provided on the selected channel is an NRT service from the received DST [S1006].

The determination of a presence of the NRT service can be performed by checking the value of the App_id_description field.

For instance, the value of the App_id_description is set to '0x0003,' in this present invention to identify that the service is an NRT application (i.e., NRT service). The value (number) is only an example and will not limit the scope of the present invention.

If the value of the App_id_description field is '0x0003,' the value of the subsequent Application_id_byte becomes the value of service ID of the NRT application (i.e., NRT service). As a result of identifying the NRT application, a Tap is extracted to locate the PID of the MPEG-2 TS packet separated from the IP datagram of the NRT service signaling channel [S1007]. And, stream PID including association_tag of the Tap is extracted from the PMT [S1008]. The steps of [S1006] to [S1008] are processed by the service manager or the PSI/PSIP section handler.

After receiving and decapsulating the MPEG-2 TS packets corresponding to the stream PID, i.e, removing the MPEG-2 header, a DSM-CC addressable section is recovered [S1009]. This process is handled by the addressable section handler.

Subsequently, after removing section header and CRC checksum from the DSM-CC addressable section, IP datagram transmitting the NRT service signaling channel is recovered [S1010], and the NRT service signaling data is obtained from the recovered IP datagram [S1011]. At this time, the access information of the IP datagram transmitting the NRT service signaling channel is received from a well-known destination IP address and well-known destination UDP port number.

If a value of Protocol_encapsulation in the DST is set to '0x04', an asynchronous IP datagram is transferred. If Selector_type is set to '0x0102', a value of device_id indicating a destination address is delivered via selector_bytes. In order to accurately analyze the value of the selector_bytes, multiprotocol_encapsulation_descriptor is used and the number of the valid byte within the device_id is signaled. As a result, the IP Multicast address (or address range) of the NRT service signaling channel transmitted through PID of the Tap information is known.

Thus, by accessing the IP Multicast address (or address range), IP stream, i.e., IP packet is received, and the NRT service signaling data is extracted from the IP packet.

Based on the extracted NRT service signaling data, NRT service data, i.e., NRT content item/files can be received and stored in a storage unit or can be displayed through a display.

In an embodiment, the NRT service signaling data transmitted through the NRT service signaling channel may include NRT Service Map Table (or Service Table: NST) and NRT Information Table (NRT-IT).

In an embodiment, IP datagrams of the NST and NRT-IT has the same well-known IP address and well-known UDP port number. Therefore, the determination of NST and NRT-IT included in the NRT service signaling data is done through table identifier. Thus, the table identifier can be the table_id of the corresponding table or the header of the table section, and when necessary, table_id_extension can be referred to in order to identify the table.

The NST provides access information of the NRT service. In an embodiment, the NST has a similar table to the MPEG-2 Private section format.

The NST provides access information of IP based NRT services included in the virtual channel. For example, the NST provides access information of each FLUTE sessions that configures one NRT service.

Here, whether one NST is configured with one session or plurality of sessions is determined through the table_id field, section_number field, last_section_number field, and the like. And the table may be completed by removing the IP header and the UDP header of the IP datagrams of the NRT service signaling channel and gathering sections having the same table identifier. For example, by gathering the sections having table identifier allocated for NST, the NST is completed.

FIG. 10 and FIG. 11 illustrate a bitstream syntax structure of an NST section according to an embodiment of the present invention. The detail of each field of the NST section is explained in the following.

Although the syntax is written in an MPEG-2 private section format for better understanding, the data may be in any format. For example, it is possible to use another method in which the syntax is expressed in a Session Description Protocol (SDP) format and is then signaled through a Session Announcement Protocol (SAP).

In FIG. 10 and FIG. 11, a table_id field includes an 8-bit unsigned integer number that indicates the type of table section being defined in NRT Service Table (NST).

A section_syntax_indicator is a 1-bit field that shall be set to '0' to always indicate that this table is derived from the "short" form of the MPEG-2 private section table.

A private_indicator (1-bit) indicates whether the type of the corresponding section follows the private section type or not. (This field that shall be set to '1')

A section_length is a 12-bit field. It specifies the number of remaining bytes this table section immediately following this field. The value in this field shall not exceed 4093 (0xFFD)).

A table_id_extension field is a 16-bit field and is table-dependent. It shall be considered to be logically part of the table_id field providing the scope for the remaining fields. The table_id_extension field includes NST_protocol_version fields.

The NST_protocol_version field is an 8-bit unsigned integer field whose function is to allow, in the future, this NST to carry parameters that may be structured differently than those defined in the current protocol. At present, the value for the NST_protocol_version field shall be zero. Non-zero values of NST_protocol_version may be used by a future version of this standard to indicate structurally different tables.

A version_number field (5-bit) indicates the version number of the NST.

A current_next_indicator field is a one-bit indicator, which when se to '1' shall indicate that the NST sent is currently applicable. When the bit is set to '0', it shall indicate that the table sent is not yet applicable and will be the next table to become valid. This standard imposes no requirement that "next" tables (those with current_next_indicator set to '0') must be sent. An update to the currently applicable table shall be signaled by incrementing the version_number field).

A section_number field is an 8-bit field that shall give the section number of this NST section. The section_number field of the first section in an NST shall be '0x00'. The section_number field shall be incremented by 1 with each additional section in the NST.

A last_section_number field is an 8-bit field that shall give the number of the last section (i.e., the section with the highest section_number) of the NST of which this section is a part).

A num_NRT_services field is an 8-bit field that specifies the number of services in this NST section.

A 'for' loop, which is also referred to as an "NRT service loop", is executed for the number of times as the number of NRT services corresponding to the num_NRT_services field value in providing signaling information of a plurality of NRT services. Thus, signaling information of the corresponding NRT service is indicated for each of the NRT services included in the NST section. Here, the following field information may be provided for each NRT service.

An NRT_service_id field is a 16-bit unsigned integer number that shall uniquely identify this NRT service within the scope of this NRT section. The NRT_service_id field of a service shall not change throughout the life of the service. To avoid confusion, it is recommended that if a service is terminated, then the NRT_service_id field for the service should not be used for another service until after a suitable interval of time has elapsed.

An NRT_service_status field is a 2-bit enumerated field that shall identify the status of this NRT Service. The most significant bit shall indicate whether this NRT Service is active (when set to '1') or inactive (when set to '0') and the least significant bit shall indicate whether this NRT Service is hidden (when set to '1') or not (when set to '0'). Hidden services are normally used for proprietary applications, and ordinary receiving devices should ignore them.

A SP_indicator field is a 1-bit field that indicates when set to 1, service protection is applied to at least one of the components needed to provide a meaningful presentation of this NRT Service.

A Short_NRT_service_name_length field (3-bit) instructs the number of byte pairs within the Short_NRT_service_name field.

A Short_NRT_service_name filed (16*m bit) indicates a short name of the NRT service. This field may be filled with null data (for example, 0x00) when the NRT service has no short name.

An NRT_service_category field is a 6-bit enumerated type field that shall identify the type of service carried in the NRT.

A num_components field is a 5-bit field that specifies that number of IP stream components in this NRT Service.

An IP_version_flag is a 1-bit indicator, which when set to '0' shall indicate that source_IP_address, NRT_service_destination_IP_address, and component_destination_IP_address fields are IPv4 addresses. The value of '1' for this field is reserved for possible future indication that source_IP_address, NRT_service_destination_IP_address, and component_destination_IP_address fields are for IPv6.

A source_IP_address_flag field is a 1-bit Boolean flag that shall indicate, when set, that a source IP address value for this NRT Service is present to indicate a source specific multicast.

An NRT_service_destination_IP_address_flag field is a 1-bit Boolean flag that indicates, when set to '1', that an NRT_service_destination_IP_address field value is present, to serve as the default IP address for the components of this NRT Service.

A source_IP_address field is a 32 or a 128 bit field that shall be present if the source_IP_address_flag field is set to '1' and shall not be present if the source_IP_address_flag field is set to '0'. If present, this field shall contain the source IP address of all the IP datagrams carrying the components of this NRT Service. The conditional use of the 128 bit-long address version of this field is to facilitate possible use of IPv6 in the future, although use of IPv6 is not currently defined.

An NRT_service_destination_IP_address field is a 32 or a 128 bit field that shall be present if the NRT_service_destination_IP_address_flag field is set to '1' and shall not be present if the NRT_service_destination_IP_address field is not present, then the component_destination_IP_address field shall be present for each component in the num_components loop. The conditional use of the 128 bit-long address version of this field is to facilitate possible use of IPv6 in the future, although use of IPv6 is not currently defined.

A 'for' loop, which will also be referred to as a "component loop," is executed as much as the number of times as the number of components corresponding to the num_components field value to provide access information of a plurality of components. This provides access information of each component included in the NRT service. Here, the following field information may be provided for each component. In an embodiment, one component corresponds to one FLUTE session.

An essential_component_indicator field is a 1-bit indicator which, when set to '1', shall indicate that this component is an essential component for the NRT Service. Otherwise, this field indicates that this component is an optional component.

A port_num_count is a 6-bit field that shall indicate the number of destination UDP ports associated with this UDP/IP stream component. The values of the destination UDP port numbers shall start from the component_destination_UDP_port_num field and shall be incremented by one.

A component_destination_IP_address_flag field is a 1-bit Boolean flag that shall indicate, when set to '1', that the component_destination_IP_address field is present for this component.

A component_destination_IP_address field (32 or 128 bit) shall be present if the component_destination_IP_address_flag field is set to '1' and shall not be present if the component_destination_IP_address_flag field is set to '0'. When this field is present, the destination address of the IP datagrams carrying this component of the NRT Service shall match the address in this field. When this field is not present, the destination address of the IP datagrams carrying this component shall match the address in the NRT_service_destination_IP_address field. The conditional use of the 128 bit-long address version of this field is to facilitate possible use of IPv6 in the future, although use of IPv6 is not currently defined.

A component_destination_UDP_port_num field is a 16-bit unsigned integer field that represents the destination UDP port number for this UDP/IP stream component.

A num_component_level_descriptors field (4-bit) indicates the number of descriptors providing the additional information of the component level.

The same number of the component_level_descriptor( ) is included in the component loop providing additional information as the number of the field value of the num_component_level_descriptors.

A num_NRT_service_level_descriptors field (4-bit) indicates the number of descriptors that provide additional information about the NRT service level.

The same number of the NRT_service_level_descriptor( ) are included in NRT service loop as the number of the field value of num_NRT_service_level_descriptors to provide additional information about the NRT service.

A num_virtual_channel_level_descriptors field (4-bit) indicates the number of descriptors which provides additional information about the virtual channel level.

The same number of virtual_channel_level_descriptor( ) included in the virtual channel loop as the number of the field value of the num_virtual_channel_level_descriptors to provide additional information of the virtual channel.

FIG. 12 illustrates an embodiment of a bitstream syntax structure of a component_level_descriptors( ). The component_descriptor( ) is used as one of the component level descriptor component_level_descriptors( ) of the NST and describes additional signaling information of the corresponding component.

The following is a description of each field of the component_descriptor( ).

In FIG. 12, a descriptor_tag field (8-bit) is a descriptor identifier and it can be set as an identifier that identifies the component_descriptor( ).

A descriptor_length field (8-bit) describes the remaining length of the descriptor starting after the descriptor_length field and to the end of this descriptor, in bytes.

A component_type field (7-bit) shall identify the encoding format of the component. The value may be any of the values assigned by IANA for the payload_type of an RTP/AVP stream, or it may be any of the values assigned by ATSC, or it may be a "dynamic value" in the range 96-127. For components consisting of media carried via RTP, the value of this field shall match the value in the payload_type field in the RTP header of the IP stream carrying this component. Note that additional values of the component_type field in the range of 43-71 can be defined in future versions of this standard.

A component_encryption_flag (1-bit) informs whether the corresponding component is encrypted or not.

A Num_STKM_streams field (8-bit) indicates the number STKM streams if component_encryption_flag has been encrypted. (The num_STKM_streams field (8-bit) is an 8-bit unsigned integer field that shall identify the number of STKM streams associated with this component.

A STKM_stream_id field (8-bit) is repeated as much as the field value of Num_STKM_streams and indicates a value that identifies a STKM stream that can acquire a key required for decryption.

An NRT_component_data (component_type) element provides the encoding parameters and/or other parameters necessary for rendering this component. The structure of the component_data is determined by the value of component_type field.

For example, if the component_type field value is 35 then NRT_component_data (component_type) field provides component data for H.264/AVC video stream.

In another example, if the component_type field value is 38 then NRT_component_data (component_type) field provides data for FLUTE file delivery as shown in FIG. 13.

One NRT service can be included in multiple FLUTE sessions. Thus, one NRT service may be configured with plurality of FLUTE sessions. Each FLUTE session may be signaled using NRT_component_data( ) as shown in FIG. 13.

FIG. 13 illustrates an example of the bitstream syntax structure of NRT_component_data( ) that provides data for FLUTE file delivery according to the present invention. The following explains each field in the NRT_component_data( ).

A TSI field (16-bit unsigned integer) shall be the Transport Session Identifier (TSI) of FLUTE session.

A session_start_time field (16-bit) indicates the start time of the FLUTE session. If the field values are all '0', then it can be interpreted that the FLUTE session has already begun.

A session_end_time field (16-bit) indicates the end time of the FLUTE session. If the field values are all '0,' then it can be interpreted that the FLUTE session continues for unlimited amount of time.

A tias_bandwidth_indicator field (1-bit) flags the inclusion of TIAS bandwidth information. This bit shall be set to '1' to indicate the TIAS bandwidth field is present, and it shall be set to '0' to indicate the TIAS bandwidth field is absent.

An as_bandwidth_indicator field (1-bit) flags the inclusion of AS bandwidth information. This bit shall be set to '1' to indicate the AS bandwidth field is present, and it shall be set to '0' to indicate the AS bandwidth field is absent.

A FEC_OTI_indicator field (1-bit) indicates whether FEC Object Transmission Information is provided.

A tias_bandwidth field (16-bit) exists when the as_bandwidth_indicator field value is set to '1' and it indicates the maximum bandwidth. Also, it shall be one one-thousandth of the Transport Independent Application Specific maximum bandwidth as defined in RFC 3890, rounded up to the next highest integer if necessary. This gives the TIAS bandwidth in kilobits per second.

An as_bandwidth field (16-bit) exists when the as_bandwidth_indicator field value is set to '1' and it indicates the maximum AS bandwidth. Also, this value shall be the Application Specific maximum bandwidth as defined in RFC 4566. This gives the AS bandwidth in kilobits per second.

A FEC_encoding_id field exits when the FEC_OTI_indicator field value is set to '1' and indicates FEC ID used in corresponding FLUTE session. (FEC encoding ID used in this FLUTE session, as defined in RFC 3926).

A FEC_instance_id field exists when the FEC_OTI_indicator field value is set to '1' and indicates FEC instance ID used in the corresponding FLUTE session. (FEC instance ID used in this FLUTE session, as defined in RFC 3926).

The information necessary to receive FLUTE session is provided by signaling the parameters through the NRT_component_data( ) of the component_descriptor( ) within the component loop.

In other words, according to the time information set by the session_start_time field and the session_end_time field, the corresponding FLUTE session is opened and files and the FDT (File Description Table) that describes the signaling information of the files that configures NRT service (or content) is received. The FDT is used to transmit the list of all the content items, and also provides information necessary in acquiring content item and the files included in the content item.

The FDT includes file id which is the only identifier for identifying files included in the content item and instance id which is the only identifier for identifying the corresponding FDT. Moreover, a content linkage which identifies the content item corresponding to the FDT file level or instance level, may be allocated.

As an example, each file that configures the content item can be identified through Content-Location field described in the FDT of the FLUTE session. Another example is identifying each file by content linkage, TOI and Content-Location field described in the FDT of the FLUTE session.

An NRT service according to the present invention as illustrated in FIG. 2 includes one or more content item (or content or NRT content) and a content time includes one or more file.

At this point, the content item may not be updated, updated in a given time frame, or updated frequently.

For example, a content item such as economic news will not be serviced after being serviced once, updated every 2-3 hours, or updated frequently in 1-2 second intervals.

Updating a content item means that at least one of the file has been added to the content item or that at least one file in the content item has been deleted and/or the content of the existing file has been changed. When the content item has been updated, the NRT service identifier and content identifier (example: content linkage information) corresponding to the content item does not change.

If there are no information to identify whether the content item has been updated or not, the broadcast receiver cannot find out when the content item has been updated. Therefore, the broadcast receiver has to consistently monitor FDT included in the FLUTE session by always opening or joining the FLUTE session in which the content item is transmitted. For example, the file identifier of the FDT and the instance identifier need to be continuously monitored.

But even for the content item updated periodically, the corresponding FLUTE session needs to be always open so that the FDT included in the FLUTE session is continuously monitored. In such a case, it can be a burden on the broadcast receiver.

As a result, the present invention provides the update information of the content item to the broadcast receiver. In such a case the broadcast receiver in the present invention receives files that configures content item based on FDT included in the FLUTE session by opening the corresponding FLUTE session only when the content item information has been updated in the corresponding content item. Then all the files configuring the content item is received or just the updated files are received. The updated file includes files that are added to the content item.

The update information of the content item for example based on the existing table, may be included in the NRT-IT, or may be included in the newly defined table. In the present invention, the newly defined table is referred to as Content Version Table (CVT). The present invention refers the NRT-IT, NST, or CVT as Signaling Information Table.

The update information of the content item may be included in the field format or descriptor format of the NRT-IT or CVT. In an embodiment of the present invention, it is included in a field format.

The update information of the content item according to the present invention includes information indicating the version number of the corresponding content item. This field is referred to as content_version_number field in the present invention. In the present invention, when there is at least one file added to the content item, at least one file included in the content item is deleted and/or the existing file is changed, then in an embodiment, the content_version_number field value is changed.

The update information of the content item according to the present invention further includes information that distinguishes whether the corresponding content item is updated in a rapidly or at a higher rate or whether it is a periodically updated content item. In case where the content item is rapidly updated (2-3 second interval), it is more efficient to continuously monitor by opening the corresponding FLUTE session. In the present invention, the field is referred as content_version_available field. In the present invention, the rapidly updated (or frequently) content item corresponding to the content item has a value of 0 in the content_version_available field, and has a value of 1 for all other corresponding content items in the content_version_available field.

In an embodiment of the present invention, the interval of the update time is predetermined by the broadcast station for the content item that is updated rapidly and the content item that is not updated rapidly. For example, if the update occurs within 10 minutes, it is considered a rapidly updated content item. This interval is only an embodiment for ease of understanding the present invention and the present invention is not limited to the interval mentioned above.

NRT Information Table (NRT-IT)

FIGS. 14 and 15 are bitstream syntax of an NRT-IT section including the update information of the content item according to an embodiment of the present invention.

The bit-stream syntax of the NRT-IT section is described in MPEG-2 Private section format for ease of understanding the bit-stream syntax of the NRT-IT section, but the format of the data can be in other formats as well. For example, signaling through Session Announcement Protocol (SAP) described by Session Description Protocol (SDP) type is also possible.

The information provided in the NRT-IT includes the title of the content (for example, the name of the program available for download), the times during which the content is to be made available for download, and information such as content advisories, availability of caption services, content identification, and other metadata. One item of content may consist of one or more files. For example, an audio/video clip may come with a JPEG thumbnail image that can be used to represent it in on-screen displays. The NRT-IT is used to provide information for virtual channels of service_type values 0x08.

An instance of the NRT-IT can include data corresponding to an arbitrarily defined time period, or can describe NRT content starting at a specified time and into the indefinite future. Each NRT-IT instance indicates the start time of the period it covers and the length of the period it covers (which may be indefinite). Each NRT-IT instance may be segmented into as many as 256 sections. One section may contain information for multiple content items, but the information for any given content item shall not be segmented and put into two or more sections.

Any content item to be made available for download for a time interval that extends beyond the time period covered one or more NRT-IT instances shall be described only in the first of these NRT-ITs. Content item descriptions are placed within the NRT_information_table_section( ) in the order of their first availability. Therefore, when last_section_number is greater than zero (meaning the NRT-IT is delivered in multiple sections), for sections other than the first (sections for which the value of section_number is greater than zero), all the content item descriptions within a given section shall have first availability times that are greater than or equal to all first availability times of content item descriptions in the immediately preceding section (the section whose value of section_number is one lower than the given section).

Each NRT-IT identifies NRT services associated with the given value of service_id available on a particular virtual channel sometime during the time period it covers.

Here, the determination whether one NRT-IT is configured through one section or plurality of sections can be known through the table_id field, section_number field, last_section_number field, and the like, within the NRT-IT section. And the table may be completed by removing the IP header and the UDP header of the IP datagrams of the NRT service signaling channel and gathering sections having the same table identifier. For example, by gathering the sections having table identifier allocated for NRT-IT, the NRT-IT is completed.

The detailed description of the NRT-IT section fields illustrated in FIGS. 14 and 15 are described below.

A table_id field (8-bit) is set to 0xTBD to identify this table section as belonging to the Non-Real-Time Information Table.

A service_id field (16-bit) specifies the service_id field associated with the NRT service offering content items described in this section.

An NRT_IT_version_number field (5-bit) indicates the version number of this NRT-IT instance, where NRT-IT instance is defined as the set of one or more NRT_information_table_section( ) having common values for service_id field, current_next_indicator field, protocol_version field, and time_span_start field. The version number is incremented by 1 modulo 32 when any field in the NRT-IT instance changes.

A current_next_indicator field (1-bit) is always set to '1' for NRT-IT sections; the NRT-IT sent is always currently applicable.

A protocol_version field (8-bit) is set to zero. The function of protocol_version field is to allow, in the future, this table type to carry parameters that may be structured differently than those defined in the current protocol. At present, the only valid value for protocol_version field is zero. Non-zero values of protocol_version field may be used by a future version of this standard to indicate structurally different tables.

A time_span_start field (32-bit) represents the start of the time span covered by this instance of the NRT-IT, expressed as the number of GPS seconds since 00:00:00 UTC, Jan. 6, 1980. The time of day of time_span_start field is aligned to minute 00 of the hour. The value zero for time_span_start field indicates the time period covered by his NRT-IT instance began in the indefinite past. The value of time_span_start field is the same for each section of a multi-sectioned NRT-IT instance. The values of time_span_start field and time_span_length field are set such that the specified time span does not overlap with any other NRT-IT instance in this IP subnet.

A time_span_length field (11-bit) indicates the number of minutes, starting at the time indicated by time_span_start field, covered by this instance of the NRT-IT. Once established, the value of time_span_length field for a given value of time_span_start field does not change. A value of time_span_length field of zero means this NRT-IT instance covers all time starting at time_span_start field into the indefinite future. If the value of time_span_start is zero, time_span_length field has no meaning. The value of time_span_length field is the same for each section of a multi-sectioned NRT-IT instance. The values of time_span_start field and time_span length field are set such that the specified time span does not overlap with any other NRT-IT instance in this IP subnet.

A num_items_in_section field (8-bit) indicates the number of content items described in this NRT-IT section.

The 'for' loop (also referred to as content item loop) is executed for number of content items corresponding to the value of the num_items_in_section field and provides signaling information about plurality of content items. Thus, the signaling information of the content item of each content item included in the NRT service corresponding to the service_id field value is indicated. The following describes the field in each content item that may provide the information.

A content_linkage field (32-bit) in the range 0x0001 to 0xFFFF specifies the identification number of the content (or content item) described. Value 0x0000 is not used. The content_linkage field performs two linkage functions: it links metadata in the NRT-IT to one or more files in the FLUTE FDT associated with this NRT service; it also forms the TF_id field (identifier for Text Fragment in Text Fragment Table). The value of the content_linkage field corresponds to either the value of one of the FDT-Content-Linkage elements or the value of one of the File-Content-Linkage elements in the FLUTE FDT for each file associated with the content item. The precedence rules may be applied when matching each content_linkage value with the corresponding content linkage elements in the FLUTE FDT.

An updates_available field (1-bit) indicates whether the corresponding content item is updated. For example, when the content item is included in an NRT service that is ended after once service, the field is set to '0'. When the content item is one more updated, the field is set to '1'. That is, the updates_available field specifies, when set to '1,' that the referenced content item(s) will be updated. When the updates_available field is set to '0,' updates are not expected to be provided for the associated content item(s), and broadcast receivers are not expected to look for them.

A content_version_available field is a 1-bit field that indicates whether content version number (i.e., content_version_number field) is included in the current section of NRT-IT.

In the present invention, if the value of the content_version_available field is '1' then content_version_number field is included in the content item loop, and if the value is '0' then content_version_number field is not included.

Thus, if the content item is rapidly updated, even if the value of the updates_available field is '1', the content_version_number field is not included in the corresponding content item loop. At this point, the updates_available field value is '1' and the content_version_available field value is '0.' In this situation, the FLUTE session transmitting the content item is always open (or joined) and continuously monitors FDT included in the FLUTE session.

In the other hand, if the content item is updated but not rapidly, the content item loop includes the content_version_number field. The updates_available field value and the content_version_available field value are both '1.' In this situation, only when the content_version_number field value is changed, the FLUTE session transmitting the content item is opened (or joined) and the content item is downloaded by referencing to the FDT included in the FLUTE session.

A TF_available field is Boolean flag, this field specifies, when set to '1' that a Text Fragment is present in a Text Fragment Table in the service signaling channel. When the field is set to '0,' no Text Fragment is included in the service signaling channel for this content item.

A low_latency field is Boolean flag, this field specifies, when set to '1,' that the content is available within the current digital transport with a low enough latency that its retrieval should be attempted while the user waits. When the field is set to '0', retrieval latency is longer and the user interface should suggest to the user to return later for viewing.

A playback_length_in_seconds field (20-bit) specifies the duration of playback of the content, in seconds. For content consisting only of text and/or still images, the value zero is used. For content that includes audio or audio/video content, the playback_length_in_seconds field indicates the playback length of the audio or audio/video content.

A content_version_number field (32-bit) indicates the version of the content item identified by the content_linkage field. The value of this field is incremented whenever one or more files belonging to the content item are added, deleted or updated. The content_version_number field exists when the content_version_available field value is '1,' and does not exist when the value is '0.'

The content_version_number field indicates the latest version number of the corresponding content item. In order to check whether the content item has been updated or not, the version number of the corresponding content item needs to be compared with the most recent version number prior to the current content_version_number field value. In order to execute such comparison, in an embodiment of the present invention, the content_linkage field value identifying the content item and the content_version_number field value of the most recent version number prior to the current content_version_number field value identified by the content_linkage field value are stored.

The broadcast receiver of the present invention may detect the change in the FLUTE session of the corresponding content item through the updates_available field, content_version_available field, and content_version_number field in the current content item loop. Thus, by using the updates_available field, it is possible to find out whether the content item is updated rapidly or not. Further, by using the content_version_number field, it is possible to find out whether the files included in the corresponding content item has been changed or not.

For example, when the updates_available field value is '0,' then there is no content update so that the receiver does not have to check for any update.

In a different example, when the updates_available field is '1' and content_version_available field is '0,' 0 the implication is that the contents are being updated too frequently to be signaled properly by NRT-IT. In this case, the broadcast receiver has to join the FLUTE session and check the FDT instances to find out what has changed in the NRT service of interest. Thus, it is able to detect changes in the FLUTE session of the corresponding content item in the FLUTE session level.

In another example, when both updates_available and content_version_available fields are '1', the receiver can detect that the changes have occurred in the FLUTE session. If the receiver sees that the version number of a content item has changed, it can join the FLUTE session, check the FDT instances, and see which files of that content item have changed—new files added, previous files deleted, and/or new versions of existing files. Then it only has to download the new files and the new versions of existing files. In practice, this means that it just needs to download any files with new TOI values for that content item. It can check the Content-Location field of each file to see whether it is a new file or an update to an existing file.

A content_length_included field is Boolean flag, this field indicates, when set to '1,' that the content_length field is present in this iteration of the "for" loop. Setting this field to '0' indicates the content_length field is not present in this iteration of the "for" loop.

A playback_delay_included field is Boolean flag, this field indicates, when set to '1,' that the playback_delay field is present in this iteration of the "for" loop. Setting this field to '0' indicates the playback_delay field is not present in this iteration of the "for" loop.

An expiration_included field is Boolean flag, this field indicates, when set to '1,' that the expiration field is present in this iteration of the "for" loop. Setting this field to '0' indicates the expiration field is not present in this iteration of the "for" loop.

A duration field (12-bit) in the range 1 to 2880 specifies the expected cycle time, in minutes, of the carousel containing the referenced content item. A broadcast receiver is expected to use the duration parameter to determine the amount of time needed to capture the referenced content.

A content_length field (40-bit), when present, represents the total size in bytes of the content item or items. This item is used by the broadcast receiver to determine if enough memory is available to store it before downloading is attempted.

A playback_delay field (20-bit) counts of the number of seconds following reception of the first byte of the associated content the broadcast receiver waits before playback may start, while buffering the incoming stream. A value of zero indicates playback may commence immediately. When playback_delay field is not provided, the broadcast receiver is expected to retrieve the complete file or file set prior to playback.

An expiration field (32-bit) represents the expiration time of the content, expressed as the number of GPS seconds since 00:00:00 UTC, Jan. 6, 1980. Following expiration, the content is deleted from memory. If an expiration time is not specified, broadcast receivers are expected to use methods of their own choosing to manage memory resources.

A content_name_length field (8-bit) specifies the length (in bytes) of the content_name_text( ).

A content_name_text( ) field specifies the content item title in the format of a multiple string structure.

A content_descriptors_length field (12-bit) indicates the total length (in bytes) of the content descriptor( ).

A content descriptor( ) 는 is separately applied to each content item.

A descriptors_length field (10-bit) indicates the total length (in bytes) of the descriptor( ).

A descriptor( ) 는 is commonly applied to all content items described in the current NRT-IT section.

FIG. 16 is a flowchart of the process of how the update of the content item using the NRT-IT section of FIGS. 14 and 15 are checked and handled. First of all, IP/UDP packets regarding the NRT service signaling channel is parsed [S1201]. Next, from the parsed IP/UDP packets, NRT-IT is obtained and each fields are analyzed [S1202]. The IP datagram of NST and NRT-IT has same well-known IP address and well-known UDP port number included in the NRT service signaling channel. Therefore, the classification of the NRT-IT included in the NRT service signaling channel is accomplished through the table identifier.

The processes of content items included in the NRT-IT section are each executed. Thus, regarding each content item, if the value of the updates_available field is '0' [S1203], then there is no need to check for an update on the corresponding content because there is no content update [S1204].

If in the value of the updates_available field is '1' [S1203], then it is checked to see whether the value of the content_version_available field is '0' [S1205]. If the value of the content_version_available field is '0,' then it means that the content item is updated too frequently. In such a case in order to check whether there is a change in the NRT service, FDT instance is continuously monitored by accessing the corresponding FLUTE session [S1206]. If the identifier or the instance identifier is changed from monitoring, it is deemed that there has been a content update and the files included in the content item are downloaded [S1207]. Therefore, if the value of the updates_available field is '1,' and the value of the content_version_available field is '0,' then content update is determined by using the FDT instances.

If the updates_available field value and the content_version_available field value are both '1,' then the pre-stored content version number of the corresponding content item is compared with the content version number included in the NRT-IT [S1208]. If the two content version numbers are different, then it is deemed that there is a content update. And only when there is a content update, the files corresponding to the content item based on the FDT included in the FLUTE session are downloaded [S1209]. Therefore, when updates_available field value and the content_version_available field value are both '1,' then using the NRT-IT the content update is determined.

Content Version Table (CVT)

The update information of the content item according to the present invention can be included in the CVT fields instead of the NRT-IT and it can also be included as a descriptor format. According to an embodiment of the present invention, it is included as a field format.

If the content update information is included in the CVT according to the present invention, reserved field is allocated in the content_version_available field of the NRT-IT in FIGS. 14 and 15, and content_version_number field is not allocated according to an embodiment.

FIG. 17 illustrates a bitstream syntax structure of a CVT section including update information of the content item according to an embodiment of the present invention.

For the convenience of understanding the bitstream syntax structure of the CVT section is written in the MPEG-2 Private section format, but the corresponding data format can be in any format. For example, through Session Announcement Protocol (SAP), Session Description Protocol (SDP) format can be used among others methods.

At this point, it is possible to find out whether one CVT is configured in one section or in plurality of sections through the table_id field, section_number field, and the last_section_number field within the CVT section.

The detailed explanation of each fields of the CVT section in FIG. 17 are as follows.

A table_id field (8-bit) indicates the identifier of the table and indicates the value that identifies this table as CVT.

A section_syntax_indicate field (1-bit) defines the formation of the CVT section.

A private_indicator field (1-bit) indicates whether the corresponding CVT follows the private section or not.

A section_length field (12-bit) indicates the section length of the corresponding CVT section.

A service_id field (16-bit) specifies the service_id field associated with the NRT service offering content items described in this section.

A CVT_version_number field (5-bit) indicates version number of the CVT.

A current_next_indicator field (1-bit) indicates whether the information included in the corresponding CVT section is information that can be applied now or in the future.

A section_number field (8-bit) indicates the section number of the current CVT section.

A last_section_number field (8-bit) indicates the last section number of the CVT.

A CVT_protocol_version is an 8-bit unsigned integer field whose function is to allow, in the future, this CVT to carry parameters that may be structured differently than those defined in the current protocol. At present, the value for the CVT_protocol_version shall be zero. Non-zero values of CVT_protocol_version may be used by a future version of this standard to indicate structurally different tables.

A num_items_in_section field (8-bit) indicates a number of content items in the CVT section.

The version information regarding the plurality of the content item is provided by executing the 'for' loop (or the content item loop) as many times as the number of content items indicated by the num_items_in_section field value.

A content_linkage field (16-bit) in the range 0x0001 to 0xFFFF specifies the identification number of the content (or content item) described. Value 0x0000 is not used. The content_linkage field links metadata in the CVT to one or more files in the FLUTE FDT associated with this NRT service. The value of the content_linkage field corresponds to either the value of one of the FDT-Content-Linkage elements or the value of one of the File-Content-Linkage elements in the FLUTE FDT for each file associated with the content item. The precedence rules may be applied when matching each content_linkage value with the corresponding content linkage elements in the FLUTE FDT.

A content_version_number field (32-bit) indicates the version of the content item identified by the content_linkage field. The value of this field shall be incremented whenever one or more files belonging to the content item are added, deleted or updated.

The CVT would not contain content items that are never updated, nor content items that are constantly updated at a high rate. More specifically, for fixed broadcasts, the CVT will contain the content items that are in the instance of the NRT-IT covering the current time, except for those for which updates_available is false and those that are constantly updated at a high rate.

The updates_available field in the NRT-IT can be used to distinguish between these two cases.

For example, assume that there are content item 1, content item 2, content item 3, and content item 4 included in the NRT service identified by the service_id field within the NRT-IT. Further, content item 1 is updated very frequently (or rapidly), content item 2 and content item 4 is updated periodically but not rapidly, and content item 3 is not updated.

In this case, the updates_available field value is '1' for content items 1, 2, and 4 in the content item loop of the NRT-IT and the value is '0' for content item 3. And only the update information for content item 2 and content item 4 is included in the CVT.

The broadcast receiver does not check for update for content item 3.

Update for content item 1 cannot be checked in CVT. In this situation, the broadcast receiver needs to have the FLUTE session always opened to check for update of content item 1 and continuously monitor FDT included in the FLUTE session. When update is confirmed during monitoring, updated file is downloaded with reference to the FDT.

In the other hand, update information regarding content item 2 and content item 4 can be checked from CVT. In such a case the broadcast receiver checks for update of the content item through the content_linkage field and content_version_number field of each content item loop in the CVT. And then, when there is an update the FLUTE session is joined and the files that have been added or updated from the content item based on the FDT instance included in the FLUTE session are searched for and downloaded.

More specifically, whenever a new version of a content item is to be transmitted, it would be signaled by a new version of the CVT. The new CVT version would appear after the last transmission of the previous version of the content item is completed, and before the first transmission of the new version of the content item is started. The content_version_number field value is the most recent version number of the corresponding content item. In order to check for an update of the content item, it needs to compare the version number of the most recent version number of the corresponding content item. In order to do this content_linkage field value able to identify the content item and the content_version_number field value having the most recent version number of the content item is stored according to an embodiment of the present invention.

As an embodiment of the present invention, CVT is included in the NRT service signaling channel and received. CVT, NRT-IT, and NST have same well-known IP address and well-known UDP port number. In other words, the NRT service signaling channel can be received without separate access information. Therefore, the determination of CVT included in the NRT service signaling data is done through table identifier. The table identifier can be the table_id of the corresponding table or the header of the table section, and when necessary, table_id_extension can be referred to in order to identify the table.

In an another embodiment of the present invention, CVT may be received through a well-known IP address and well-known UDP port number by IP packet that is different from the well-known IP address and well-known UDP port number of the NRT service signaling channel. In such a case, the CVT may be received without separate IP access information.

In a different embodiment of the present invention, IP address and UDP port number of CVT can be received through a different table, for example, NST. In such a case CVT can be acquired using the IP address and UDP port number included in the NST.

Figure 18:
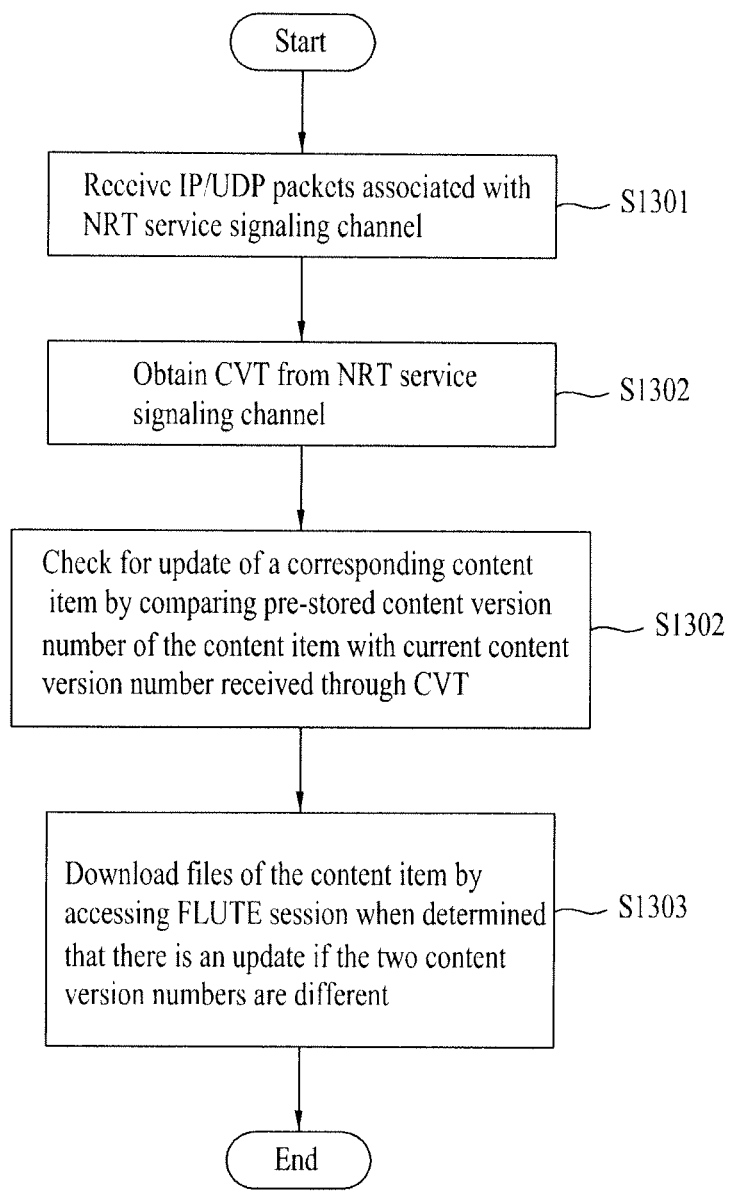
FIG. 18 is a flowchart of the process of identifying and handling the update of the content item using the CVT section according to an embodiment of the present invention.

FIG. 18 is a flowchart illustrating the process of updating and handling the content item using the CVT when CVT is received by included in the NRT service signaling channel.

First, IP/UDP packets associated with the NRT service signaling channel are parsed [S1301]. Next, from the parsed IP/UDP packets, CVT section is obtained and each fields are analyzed [S1302].

The remaining procedures are executed independently with regard to the content item included in the CVT section. The content version number pre-stored for the corresponding content item is compared with the content version number included in the CVT section [S1303]. If the two content version numbers are different, then it is deemed that there is a content update on the content item. Only in that case the files of content item based on FDT that is included in the FLUTE session is accessed and downloaded [S1304]. That is, content update of the corresponding content item is done through the use of CVT.

FIG. 19 illustrates a bitstream syntax structure of CVT_location_descriptor( ) according to an embodiment of the present invention.

FIG. 19 applies in cases where CVT is not transmitted through NRT service signaling channel and also not using a well-known IP address and well-known UDP port number.

In an embodiment of the present invention, the CVT_location_descriptor( ) is transmitted as one of the service_level_descriptors( ) of NST as illustrated by FIG. 10 and FIG. 11.

The detailed explanation of each fields of the CVT_location_descriptor( ) are as follows.

In FIG. 19, the descriptor_tag field (8-bit) is a descriptor identifier to establish as an identifier for identifying CVT_location_descriptor( ).

A descriptor_length field (8-bit) indicates the remaining length in byte.

A CVT_UDP_port field (16-bit) indicates the UDP port number of UDP/IP stream that transmits the CVT.

A CVT_IP_address field (32 or 128 bit) indicates the IP address of IP datagrams that transmits the CVT. A value of the CVT_IP_address field may be used 32-bit or 128-bit according to an IP version (i.e., IPv4 or IPv6).

Figure 20:
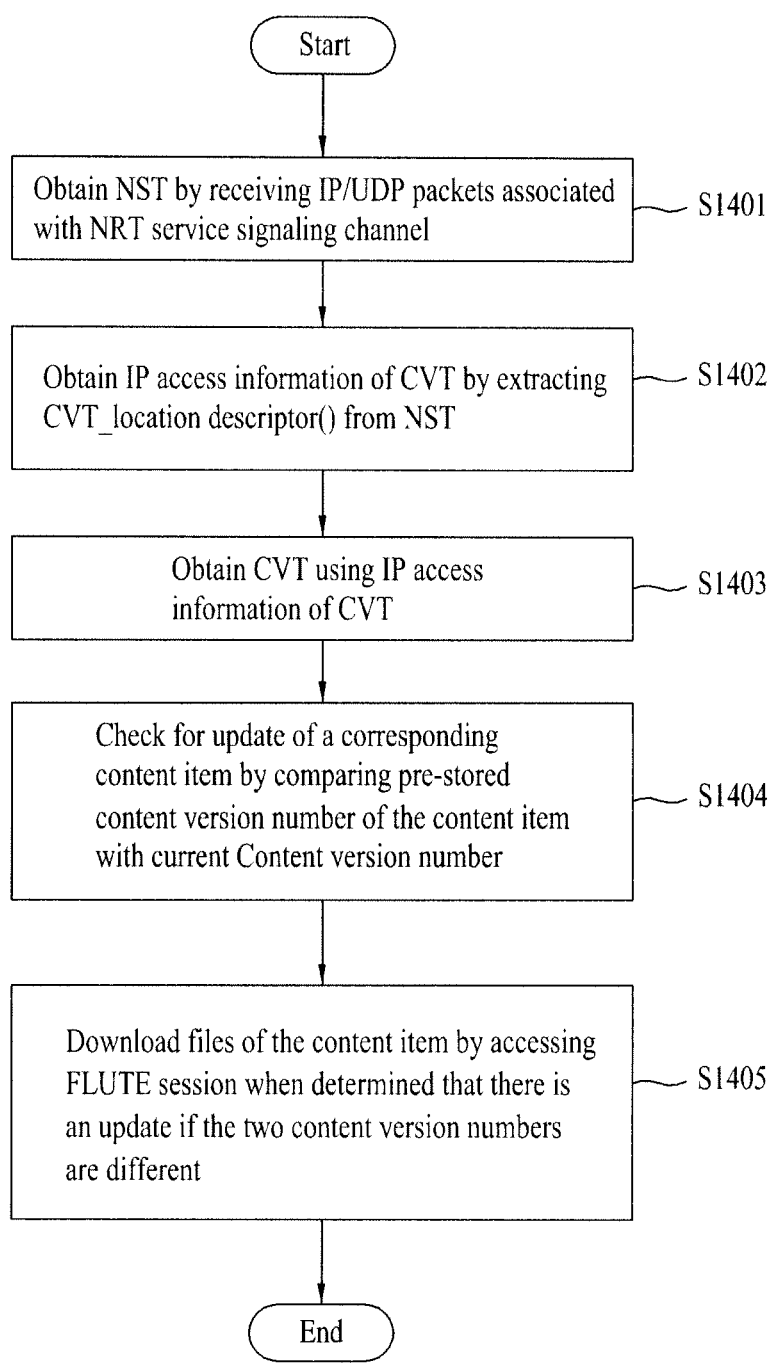
FIG. 20 is a flowchart of the process of identifying and handling the update of the content item using another CVT section according to another embodiment of the present invention.

FIG. 20 is a flowchart that illustrates a process of updating and handling a content item using the received CVT after receiving the corresponding CVT by acquiring IP address and UDP port number of CVT from the NST when the IP address and UDP port number is included in the NST.

First, after parsing the IP/UDP packets associated with the NRT service signaling channel, NST is obtained [S1401]. From the obtained NST, IP access information of CVT section, the IP address and the UDP port number is extracted [S1402]. Based on the extracted IP address and UDP port number, CVT is received and each field is analyzed [S1403].

The remaining procedures are processed individually by content items included in the CVT section. The content version number pre-stored for the corresponding content item is compared with the content version number included in the CVT section [S1404]. If the two content version numbers are different, then it is deemed that there is a content update on the content item. Only in that case the files of content item based on FDT that is included in the FLUTE session is accessed and downloaded [S1405]. Therefore, content update of the corresponding content item is done through the use of CVT.

Method of handling the update information of content item applied to a Fixed NRT service was explained. However, the present invention can be applied to Mobile NRT service as well.

According to the present invention, a Service Map Table (SMT) exists as a signaling information table for Mobile NRT service.

The SMT is included in a mobile broadcast and provides access information of component (or content item) included in real time service or non-real time service. SMT is a signaling information table which corresponds to NST of the Fixed NRT service. If the service included in the mobile broadcast is an NRT service, signaling information including access information of the FLUTE session transmitting content item/files configuring NRT service from the SMT may be extracted. In addition, detail information of the content items configuring the NRT service from the OMA BOAST service guide (SG) may be extracted. In an embodiment, Service Map Table (SMT) and OMA BOAST SG are used for signaling Mobile NRT service.

Allocating "UpdatesAvailable" element which is a Boolean-value in the PrivateEXT area of SG content fragment of OMA BOAST in the Mobile NRT service is an embodiment of the present invention. The "UpdatesAvailable" element has the same semantics as update available field of the fixed NRT service. In this case, update information of the content item may be included the SG content fragment of OMA BOAST or the CVT of the present invention.

FIG. 21 illustrates an example of allocating "UpdatesAvailable" element in the SG content fragment of OMA BCAST. The "UpdatesAvailable" element is included in the PrivateExt area of the SG content fragment. The "UpdatesAvailable" element is referred as UpdatesAvailableType. In an embodiment, the restriction base of the UpdatesAvailableType is a Boolean. The UpdatesAvailableType is characterized as a simpleType.

If the update information of the content item in the Mobile NRT service is included in the CVT and received, the CVT is included in the NRT service signaling channel for mobile NRT service and may be received. In such a case the CVT and the SMT have the same well-known IP address and well-known UDP port number.

Further, the CVT may be packetized and received in a different well-known IP address and well-known UDP port number from the well-known IP address and well-known UDP port number of the NRT service signaling channel. In addition, in the present invention, the IP address and UDP port number of the CVT may by received as a service level descriptor of the SMT. In such a case, CVT is obtained using the IP address and the UDP port number included in the SMT. For mobile broadcasts, the CVT will contain the content items for which the current time lies within a Distribution-Window of the Content fragment in a Schedule, except for those for which UpdatesAvailable is false and those that are constantly updated at a high rate. Whenever a new version of a content item is to be transmitted, it will be signaled by a new version of the CVT. The new CVT version will appear after the last transmission of the previous version of the content item is completed, and before the first transmission of the new version of the content item is started.

In a Mobile NRT service, except for the fact whether the content item is an updatable item or if it is updatable, the rate of the update is identified by the allocated "UpdatesAvailable" element allocated in the SG content fragment of OMA BCAST, the process of downloading and identifying the update of the content item has been explained above in the Fixed NRT service, therefore, it is omitted.

Figure 22:
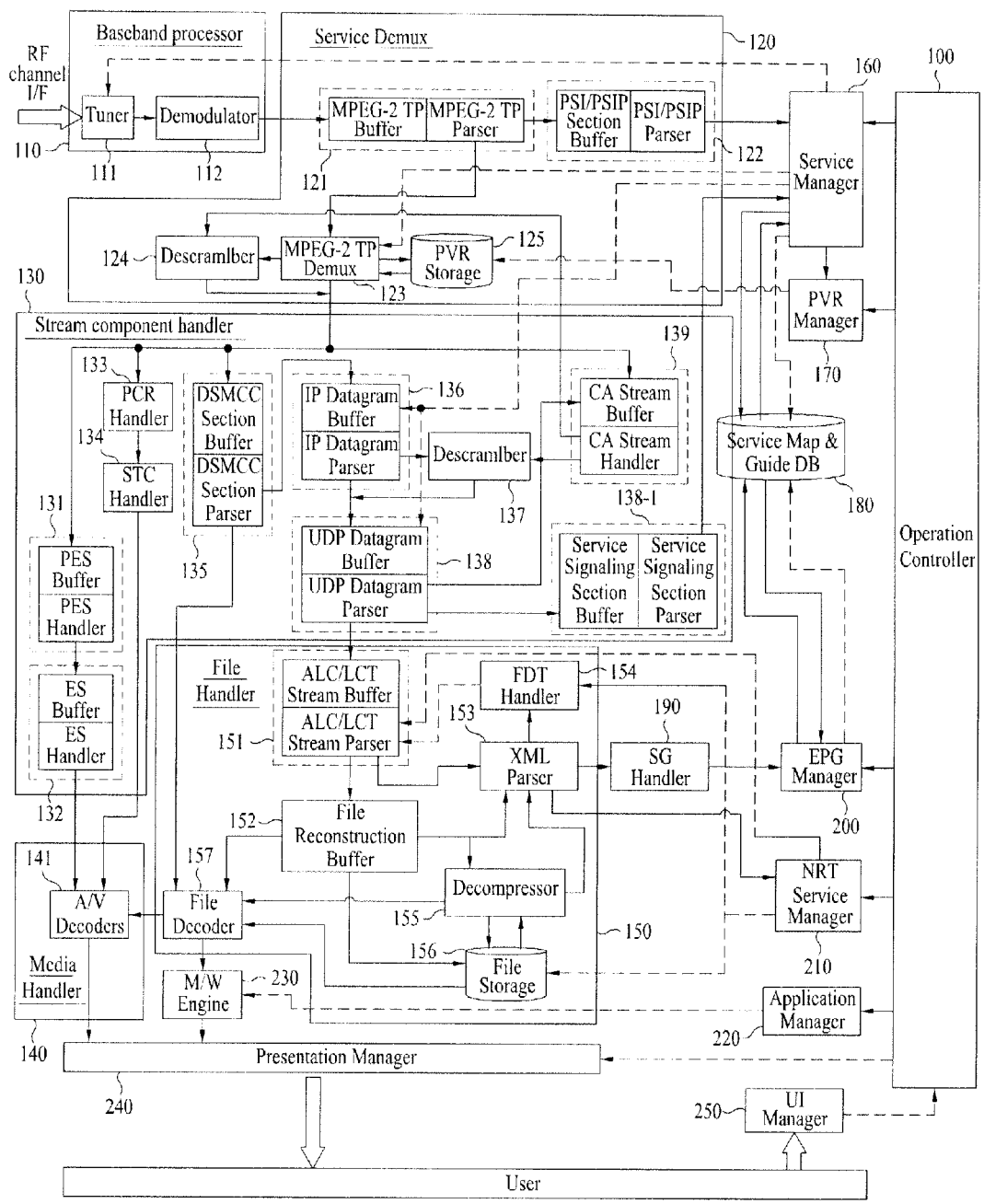
FIG. 22 is a block diagram illustrating a broadcast receiver that provides a Fixed NRT service according to an embodiment of the present invention.

FIG. 22 is a block diagram of a broadcast receiver for a Fixed NRT service according to an embodiment of the present invention.

The broadcast receiver in FIG. 22 includes an Operation Controller 100, a Baseband processor 110, a Service Demultiplexer 120, a Stream component handler 130, a Media Handler 140, a File Handler 150, a Service Manager 160, a PVR Manager 170, a first storage unit 180, an SG Handler 190, an EPG Manager 200, an NRT Service Manager 210, an Application Manager 220, a MiddleWare Engine 230, a Presentation Manager 240, and a UI Manager 250.

The Baseband processor 110 includes a Tuner 111 and a Demodulator 112. The Service Demultiplexer 120 includes an MPEG-2 TP Handler 121, a PSI/PSIP Handler 122, a Demultiplexer 123, a Descrambler 124 and a second storage unit 125.

The Stream component handler 130 includes a Packetized Elementary Stream (PES) decoder 131, an Elementary Stream (ES) decoder 132, a PCR Handler 133, an STC Handler 134, a DSM-CC Addressable Section Handler 135, an IP Datagram Handler 136, a Descrambler 137, a UDP Handler 138, a Service Signaling Section Handler 138-1, and a Conditional Access System (CAS) 139.

The Media Handler 140 includes an A/V Decoders 141. The File Handler 150 includes an ALC/LCT Stream Handler 151, a File Reconstruction Buffer 152, an XML Parser 153, an FDT Handler 154, a Decompressor 155, a third storage unit 156, and a File Decoder 157.

In the present invention, the first handler which receives and handles NST, NRT-IT, and CVT includes at least the Service Manager 160 and the Service Demultiplexer 120. Also, the second handler which receives content item including at least one file in non-real time and executes to store in a storage media, includes at least the Baseband processor 110, the Service Demultiplexer 120, the Stream component handler 130, and the Media Handler 140. The storage media can be any one of the first storage unit 180, the second storage unit 125, or the third storage unit 156. The third handler which receives at least one file of the updated content by accessing the FLUTE session for transmitting the content includes at least the Service Manager 160, the NRT Service Manager 210, the Stream Component Handler 130, and the Media Handler 140.

The Tuner 111 for example in FIG. 22 detects signal transmitted over the terrestrial system with the control from the Service Manager 160 and tunes only the wanted channel, down converts to Intermediate Frequency (IF), and outputs to the Demodulator 112. The Tuner 111 may receive both real time stream and non-real time stream. In the present invention, non-real time stream is referred to as NRT stream.

The Demodulator 112 receives digital IF signal of pass bandwidth inputted from the Tuner 111 and performs automatic gain control, reconstructs carrier frequencies and timing to convert into baseband signal and equalizes the channel. For example, if the broadcast signal is a VSB modulated signal, a VSB demodulation process is executed for automatic gain control, and reconstructs carrier frequencies and timing. In the Demodulator 112, demodulated and equalized channel data is outputted to the MPEG-2 TP Handler 121 in a MPEG-2 Transport Stream (TS) packet format.

The MPEG-2 TP Handler 121 is configured of an MPEG-2 TP Buffer and an MPEG-2 TP Parser, temporarily stores the Demodulator 112 output and then analyzes TS Header, and outputs to the Demultiplexer 123 if the Demodulator 112 output is a real time A/V TS packet or NRT TS packet and outputs to the PSI/PSIP Handler 122 if the output is a TS packet for PSI/PSIP table.

The PSI/PSIP Handler 122 is configured of a PSI/PSIP Section Buffer and a PSI/PSIP Parser, and temporarily stores the outputted TS packet from the MPEG-2 TP Handler 121 to reconstruct the corresponding table from PSI/PSIP Section data included in the payload of TS packet with referencing table identifier and then parse it. At this time, it is possible to find out whether one table is configured by one section or plurality of sections by the table_id field, section_number field, and last_section_number field within the corresponding section. Further, completing the corresponding table is possible by gathering sections having identical table identifiers. For example, it is possible to complete a VCT by gathering the sections having table identifiers allocated to VCT. Also, each of the parsed table information is collected by the Service Manager 160 and then stored in the first storage unit 180. The VCT, PAT, PMT, DST and the like, are stored in the first storage unit 180 after going through the process. The Service Manager 160 stores the table information in the first storage unit 180 in the Service Map & Guide DB format.

The Demultiplexer 123 divides audio TS packet and video TS packet and then outputs to the PES Decoder 131 if the TS packet is real time A/V TS packet and outputs to the DSM-CC Handler 135 if it is an NRT TS packet. Also, the Demultiplexer 123 outputs to the PCR Handler 133 if the TS packet includes Program Clock Reference (PCR) and outputs to the CAS 139 if the TS packet includes Conditional Access (CA) information. The NRT TS packet is divided into TS packet including NRT service data and TS packet including NRT service signaling channel. A unique PID is allocated to identify the NRT service in the TS packet of the NRT service data and the PID of the TS packet including the NRT service signaling channel is extracted using DST and PMT.

The Demultiplexer 123 outputs to the Descrambler 124 if the payload of the inputted TS packet is scrambled and the Descrambler 124 receives descrambling information needed for descrambling (for example, control word used in scrambling) from the CAS 139 and performs descrambling of the TS packet.

The Demultiplexer 123 stores A/V packet of real time from any one of the record, timed-record, or time shift request in the second storage unit 125. The second storage unit 125 is a mass storage device, an example of it can be a HDD. The download (storage) and upload (playing) in the second storage unit 125 is controlled by the PVR Manager 170.

The Demultiplexer 123 outputs to the PES Decoder 131 by dividing audio TS packets and video TS packets from A/V TS packets uploaded from the second storage unit 125 according to a playback request.

The Demultiplexer 123, in order to perform such functions, is controlled by Service Manager 160 and/or PVR Manager 170.

Thus the Service Manager 160 receives DST by extracting the PID of the DST from the service location descriptor (or ES loop of PMT) of the VCT when the service_type field value indicates that NRT service is transmitted.

Further, NRT service is identified through the received DST, and extracts DST and PMT by using the PID of MPEG-2 TS including NRT service signaling channel. The extracted PID is outputted to the Demultiplexer 123. The Demultiplexer 123 outputs to the Addressable Section Handler 135 the MPEG-2 TS packets corresponding to PID outputted by the Service Manager 160.

The PCR is a standard time value used in syncing audio ES and video ES in the A/V Decoder 141. The PCR Handler 133 outputs to STC Handler 134 reconstructed PCR included in the payload of the inputted TS packet. The STC Handler 134 outputs to the A/V Decoder 141 reconstructed System Time Clock (STC) which is the standard clock from the system by the PCR.

The PES Decoder 131 is configured with a PES Buffer and a PES Handler, temporarily stores audio TS packet and video TS packet and removes TS header from each TS packet and reconstructs to audio PES and video PES. The reconstructed audio PES and video PES is outputted to the ES Decoder 132. The ES Decoder 132 is configured with an ES Buffer and an ES Handler, removes each PES header from audio PES and video PES and reconstructs audio ES and video ES which are pure data.

The A/V Decoder 141 uses each decoding algorithms to decode the audio ES and video ES and reconstructs to pre-compressed status and then outputs to the Presentation Manager 240. At this point, depending on the STC, the time sync is executed when audio ES and video ES are decoding. In one example, the audio decoding algorithm may apply at least one of AC-3 decoding algorithm, MPEG 2 audio decoding algorithm, HE AAC decoding algorithm, AAC SBR decoding algorithm, AAC+ decoding algorithm, HE AAC decoding algorithm, AAC SBR decoding algorithm, MPEG surround decoding algorithm, or BSAC decoding algorithm, and the video decoding algorithm may apply at least one of MPEG 2 video decoding algorithm, MPEG 4 video decoding algorithm, H.264 decoding algorithm, SVC decoding algorithm, and VC-1 decoding algorithm.

The CAS 139 is configured with a CA Stream Buffer and a CA Stream Handler, and the TS packet outputted from the MPEG-2 TP Handler 121 or the service protection data reconstructed and outputted from the UDP Datagram Handler 138 is temporarily stored and then reconstruct the needed information (control word used in scrambling) to descramble the stored TS packet or the service protected data. Thus, the CAS 139 acquires necessary information to descramble after extracting the Entitlement Management Message (EMM) and Entitlement Control Message (ECM) included in the payload of the TS packet, and then by analyzing the extracted EMM and ECM. The ECM may include the Control Word (CW) used in scrambling. The CW may be encrypted using the authentication key. The EMM may include authentication key of the corresponding data and the requirements information. The acquired information necessary for descrambling from the CAS 139 will be outputted to the Descramblers 124, 137.

The DSM-CC Section Handler 135 is configured with a DSM-CC Section Buffer and a DSM-CC Section Parser, temporarily stores the TS packet outputted from the Demultiplexer 123 and then reconstructs the addressable section included in the payload of the TS packet, and outputs to the IP Datagram Handler 136 after removing the header and the CRC checksum from the addressable section and then reconstructing the IP Datagram. The IP Datagram Handler 136 is configured with an IP Datagram Buffer and an IP Datagram Parser, and after buffering the IP datagram delivered from the DSM-CC Section Handler 135, extracts and analyzes the header of the buffered IP datagram and then outputs to the UDP Datagram Section Handler 138 after reconstructing the UDP datagram from the payload of the IP datagram.

At this point, if the IP datagram is scrambled, the scrambled UDP datagram is descrambled in the Descrambler 137 and then outputted to the UDP Datagram Handler 138. In one example, the Descrambler 137 gathers information needed for descrambling (for example, control words needed for scrambling) from the CAS 139 and descrambles the UDP datagram and then outputs to the UDP Datagram Handler 138.

The UDP Datagram Handler 138 is configured with UDP Datagram Buffer and UDP Datagram Parser, and after buffering the UDP datagram outputted from the IP Datagram Handler 136 or the Descrambler 137, extracts and analyzes the header of the buffered UDP datagram and reconstructs the data included in the payload of the UDP datagram. At this point, if the reconstructed data is service protection data then it is outputted to the CAS 139 and if it is NRT service signaling data, then it is outputted to the service signaling section handler 138-1, and if it is NRT service data then it is outputted to the ALC/LCT stream handler 151.

In an embodiment, the access information of the IP datagram transmitting NRT service signaling channel is a well-known destination IP address and well-known destination UDP port number.

Therefore, the IP Datagram Handler 136 and UDP Datagram Handler 138 has well-known destination IP multicast address and well-known destination UDP port number, and the IP multicast stream which transmits NRT service signaling channel, extracts the NRT service signaling data and outputs to the Service Signaling Section Handler 138-1.

The Service Signaling Section Handler 138-1 is configured with a Service Signaling Section Buffer and a Service Signaling Section Parser, and outputs to the Service Manager 160 the reconstructed and parsed NRT-IT received from the NRT Service Signaling Data such as the NST illustrated in FIG. 10 and FIG. 11, and the NRT-IT illustrated in FIG. 14 and FIG. 15. The access information of the FLUTE session transmitting content item/files configuring NRT service can be acquired when the NST is parsed. According to the present invention, if the CVT is included in the NRT service channel and received, the Service Signaling Section Handler 138-1 restores and parses the CVT as illustrated in the NRT service signaling data of FIG. 17 and outputs to the Service Manager 160. If the IP access information of the CVT is included in the NST and then received, one of the Service Signaling Section Handler 138-1, the Service Manager 160 or the NRT Service Manager 210 obtains IP address and UDP port number from CVT_location_descriptor( ) of the NST, and then receive CVT based on the obtained IP address and UDP port number.

The parsed information from NST, NRT-IT and/or CVT is gathered by the Service Manager 160 and stored in the first storage unit 180. The service manger 160 stores information extracted from NST, NRT-IT and/or CVT in the first storage unit 180 in the service map and guide data format. In another embodiment, the NRT Service Manager 210 can assume the role of the Service Manager 160. Therefore, the parsed information from NST, NRT-IT and/or CVT may be gathered by the NRT Service Manager 210 and stored in the first storage unit 180.

Further either the Service Manager 160 or the NRT Service Manager 210 may check the update for the content item included in the NRT service described in the NRT-IT using the NST, NRT-IT, and/or CVT and execute according to the update.

Referring the FIG. 14 to FIG. 16, the process of downloading the files of the updated content items by accessing the corresponding FLUTE session depending upon the update of each content item in the IP level using the NRT-IT is explained.

In addition, referring to FIG. 17 and FIG. 18, the process of downloading files of the updated content item by accessing the corresponding FLUTE depending on the update of each content item in the IP level using the CVT received in the NRT service signaling channel is explained.

On the other hand, if IP access information of the CVT is included in the NST and received, the CVT is obtained by using the IP access information, and using the obtained CVT, the update of each content item in the IP level is checked, and based on the result of the update, the files of the updated content item is downloaded. This process is explained by referencing to FIG. 17, FIG. 19, and FIG. 20.

The ALC/LCT Stream Handler 151 is configured with an ALC/LCT Stream Buffer and an ALC/LCT Stream Parser and after buffering the ALC/LCT structure data outputted from the UDP Datagram Handler 138, analyzes the header and the header extension of the ALC/LCT session buffered from the data. After analyzing the header and the header extension of the ALC/LCT session, if the data transmitted through ALC/LCT session is in XML structure then it is outputted to the XML Parser 153, and if the data is in file structure, it is temporarily stored in the File Reconstruction Buffer 152 and outputted to the File Decoder 157 or stored in the third storage unit 156. If the data transmitted through ALC/LCT session is data for NRT service, the ALC/LCT stream handler 151 gets controlled by the NRT service manager 210. If the data transmitted through ALC/LCT session is compressed, the Decompressor 155 decompresses and outputted to the XML Parser 153, the File Decoder 157, or the third storage unit 156.

The XML Parser 153 analyzes the XML data transmitted through ALC/LCT session and if the analyzed data is filed-based service then it is outputted to the FDT Handler 154 and if it is a data for service guide, then it is outputted to the SG Handler 190.

The FDT Handler 154 analyzes and processes the File Description Table of the FLUTE protocol through the ALC/LCT session. The FDT Handler 154 is controlled by the NRT Service Manager 210 if the received file is for the NRT service.

The SG Handler 190 gathers and analyzes the data for the service guide transmitted in XML structure, and then outputs to the EPG Manager 200.

The File Decoder 157 decodes the file outputted from the File Reconstruction Buffer 152, file outputted from the Decompressor 155, or filed uploaded from the third storage unit 156 using the pre-selected algorithm and outputs to the Middleware (M/W) Engine 230 or to the A/V Decoder 141.

The M/W Engine 230 interprets and executes the application, which is the data of the file structure. Further, through the Presentation Manager 240, the application may be outputted to an output device such as a screen or a speaker. In an embodiment, the M/W Engine 230 is a JAVA platform based M/W Engine.

The EPG Manager 200, depending upon the input from the user, outputs the service guide data after converting into a display format received from the SG Handler 190 to the Presentation Manager 240. The Application Manager 220 manages the handling of the application data received in a file format.

The Service Manager 160 gathers and analyzes the NRT service signaling data transmitted through the PSI/PSIP table data or the NRT service signaling channel and creates a service map and the stores in the second storage unit 125. The Service Manager 160 controls the access information of the NRT service that the user wants and controls the Tuner 111, Demodulator 112, and the IP Datagram Handler 136.

The Operation Controller 100 according to the command from the user through the UI Manager 250, controls at least one of the Service Manager 160, the PVR Manager 170, the EPG Manager 200, the NRT Service Manager 210, the Application Manager 220, and the Presentation Manager 240, and executes the user's command.

The NRT Service Manager 210 manages the NRT Service transmitted in content/file format through the FLUTE session on the IP layer.

The UI Manager 250 delivers the user's input through the UI to the Operation Controller 100.

The Presentation Manager 240 provides the user through a speaker and/or a screen at least one of the audio and video data outputted from the A/V Decoder 141, file data outputted from the M/W Engine 230, or service guide data outputted from the EPG Manager 210.

According to the present invention, it is possible to know the update information of the content item without having to constantly check each packet header of the FLUTE session which transmits files configuring the content item. Further, only when there is an update of the content item, files included in the content item is downloaded through accessing the FLUTE session. As described above, the present invention is possible to know the update of the content item in IP level. Furthermore, only when there is the update of the content item, the FLUTE session is accessed so there is less burden on the broadcast receiver.

The present invention allows synchronizing the signaling with the data changes easily, since the NRT-IT instances for a service and the FLUTE sessions for the service will typically be generated by the same server. In addition, it is easier to synchronize in case of the NRT-IT changes and the content changes.

The present invention is not limited to the above embodiments and it will be apparent to those skilled in the art that various modifications can be made to in the present invention as can be seen from the appended claims and such modifications are included in the scope of the invention.

What is claimed is:

1. A method of transmitting a broadcast signal for a Non-Real Time (NRT) service, the method comprising:
generating the broadcast signal including the NRT service that is delivered in advance of its use and stored in a receiving device, and signaling data including an NRT Information Table (NRT-IT) describing one or more content items in the NRT service available for download to storage in the receiving device and a Service Map Table (SMT) containing information used as a linkage between the SMT and the NRT-IT; and
transmitting the NRT service in advance of its use via a broadcast channel and the signaling data via a Service Signaling Channel (SSC) with a specific IP address and UDP port number,
wherein the NRT service is delivered within IP packets, wherein the IP packets associated with a virtual channel are identified by references in a Virtual Channel Table (VCT) and an associated Program Map Table (PMT), wherein the IP packets are carried in MPEG-2 Transport Stream using Digital Storage Media Command and Control (DSM-CC) Addressable Section format, and
wherein the NRT-IT is composed of at least one NRT-IT instance,
wherein the NRT-IT instance includes data corresponding to an arbitrarily defined time period,
wherein the NRT-IT instance includes information indicating a start time of a period covered by the NRT-IT instance and information indicating a length of the period covered by the NRT-IT instance.

2. The method of claim 1, wherein the NRT-IT includes a title of the content item, times during which the content item is to be made available for download, and content advisories, availability of caption services, content identification information of the content item.

3. The method of claim 1, wherein each content item includes at least one file.

4. The method of claim 1, wherein periods of NRT-IT instances for same NRT service do not overlap.

5. The method of claim 1, wherein the SSC is carried in a portion of the IP packets.

6. The method of claim 5, wherein the SMT is linked to the NRT-IT and carried through the SSC, the SMT describing one or more NRT services, and the NRT-IT providing descriptive metadata about the content items that make up the NRT service.

7. An apparatus for receiving a broadcast signal for a Non-Real Time (NRT) service, the apparatus comprising:
a tuner configured to receive the broadcast signal including the NRT service and signaling data including an NRT Information Table (NRT-IT) describing one or more content items in the NRT service available for download and a Service Map Table (SMT) containing information used as a linkage to the NRT-IT;
a non-transitory storage medium configured to store the NRT service that is received in advance of its use; and
an NRT service manager configured to manage the stored NRT service,
wherein the NRT service is received via a broadcast channel and the signaling data are received via a service signaling channel (SSC) with a specific IP address and UDP port number,
wherein the NRT service is delivered within IP packets, wherein the IP packets associated with a virtual channel are identified by references in a Virtual Channel Table (VCT) and an associated Program Map Table (PMT), wherein the IP packets are carried in MPEG-2 Transport Stream using Digital Storage Media Command and Control (DSM-CC) Addressable Section format,
wherein the NRT is composed of at least one NRT-IT instance,
wherein the NRT-IT instance includes data corresponding to an arbitrarily defined time period, and
wherein the NRT-IT instance includes information indicating a start time of a period covered by the NRT-IT instance and information indicating a length of the period covered by the NRT-IT instance.

8. The apparatus of claim 7, wherein the NRT-IT includes a title of the content item, times during which the content item is to be made available for download, and content advisories, availability of caption services, content identification information of the content item.

9. The apparatus of claim 7, wherein the content item includes at least one file.

10. The apparatus of claim 7, wherein periods of NRT-IT instances for same NRT service do not overlap.

11. The apparatus of claim 7, wherein the SSC is carried in a portion of the IP packets.

12. The apparatus of claim 11, wherein the SMT is linked to the NRT-IT and carried through the SSC, the SMT describing one or more NRT services, and the NRT-IT providing descriptive metadata about the content items that make up the NRT service.

* * * * *